(12) United States Patent
Yamamuro

(10) Patent No.: US 11,273,631 B2
(45) Date of Patent: Mar. 15, 2022

(54) PRINTED MATTER FOIL STAMPING SYSTEM, FOIL STAMPING PRINT CONTROL METHOD, AND FOIL STAMPING PRINT CONTROL PROGRAM

(71) Applicant: KONICA MINOLTA, INC., Tokyo (JP)

(72) Inventor: Tatsuro Yamamuro, Kashiwa (JP)

(73) Assignee: KONICA MINOLTA, INC., Tokyo (JP)

(*) Notice: Subject to any disclaimer, the term of this patent is extended or adjusted under 35 U.S.C. 154(b) by 435 days.

(21) Appl. No.: 16/506,032

(22) Filed: Jul. 9, 2019

(65) Prior Publication Data
US 2020/0031111 A1  Jan. 30, 2020

(30) Foreign Application Priority Data

Jul. 25, 2018 (JP) .............................. JP2018-139163

(51) Int. Cl.
*B44C 1/14* (2006.01)
*B41F 33/00* (2006.01)
(Continued)

(52) U.S. Cl.
CPC ............ *B41F 33/0009* (2013.01); *B41K 3/62* (2013.01); *B41M 7/00* (2013.01); *B44C 1/145* (2013.01);
(Continued)

(58) Field of Classification Search
CPC ...... G03G 15/6582; H04N 1/54; B05D 3/207; B05D 5/061; B41F 11/02; B41M 5/502; B41M 3/16
See application file for complete search history.

(56) References Cited

U.S. PATENT DOCUMENTS

| 2010/0086753 A1* | 4/2010 | Johnson | B41M 7/009 428/203 |
| 2010/0104336 A1* | 4/2010 | Christopher | G03G 15/6585 399/341 |
| 2014/0290512 A1* | 10/2014 | Raksha | B42D 25/41 101/212 |

FOREIGN PATENT DOCUMENTS

| CN | 103042849 A | 4/2013 |
| CN | 104070857 A | 10/2014 |

(Continued)

OTHER PUBLICATIONS

Office Action issued in corresponding Chinese Patent Application No. 201910659626.6, dated Dec. 24, 2020, (33 pages) with English Translation.

*Primary Examiner* — Walter L Lindsay, Jr.
*Assistant Examiner* — Jessica L Eley
(74) *Attorney, Agent, or Firm* — Buchanan Ingersoll & Rooney PC

(57) ABSTRACT

A printed matter foil stamping system includes: a printing device that forms a toner layer or an ink layer on a paper sheet in accordance with print data; and a foil stamping device that performs foil stamping on the toner layer or the ink layer, wherein the printing device or a control device that controls the printing device includes a hardware processor that generates print data capable of forming a portion in which a thickness of the toner layer or the ink layer is relatively large and a portion in which the thickness is relatively small in an area in which foil stamping is to be performed, and, in accordance with the print data, the printing device forms the toner layer or the ink layer having a portion with a relatively large thickness and a portion with a relatively small thickness on the paper sheet.

23 Claims, 18 Drawing Sheets

(51) Int. Cl.
*B41K 3/62* (2006.01)
*G06F 3/12* (2006.01)
*B41M 7/00* (2006.01)
*G03G 15/00* (2006.01)

(52) U.S. Cl.
CPC ........... *G03G 15/6582* (2013.01); *G06F 3/12* (2013.01); *G06F 3/1242* (2013.01)

(56) References Cited

FOREIGN PATENT DOCUMENTS

| | | | |
|---|---|---|---|
| CN | 107984947 | A | 5/2018 |
| JP | 2000015944 | A | 1/2000 |
| JP | 5691909 | B2 | 4/2015 |

\* cited by examiner

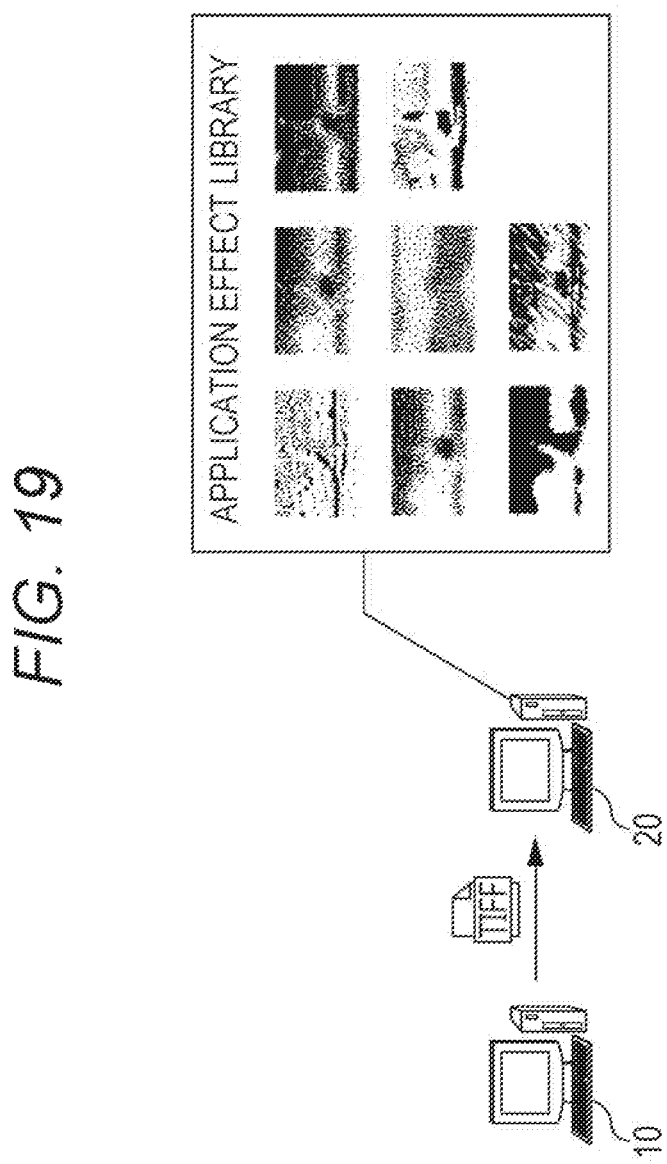

PRINTED MATTER FOIL STAMPING SYSTEM, FOIL STAMPING PRINT CONTROL METHOD, AND FOIL STAMPING PRINT CONTROL PROGRAM

The entire disclosure of Japanese patent Application No. 2018-139163, filed on Jul. 25, 2018, is incorporated herein by reference in its entirety.

BACKGROUND

Technological Field

The present invention relates to a printed matter foil stamping system, a foil stamping print control method, and a foil stamping print control program, and more particularly, to a printed matter foil stamping system including a printing device that forms a toner layer or an ink layer on a paper sheet and a foil stamping device that performs foil stamping on the toner layer or the ink layer, a foil stamping print control method for controlling formation of the toner layer or the ink layer for foil stamping, and a foil stamping print control program.

Description of the Related Art

These days, there is a growing trend toward creating not only general printed matter but also printed matter having various kinds of additional values. For example, there are known techniques for forming a varnish coating to provide a thickening print effect, and performing hot foil stamping to achieve an expressive effect that cannot be achieved with toner or ink. Particularly, the addition of gold foil or silver foil makes the appearance of printed matter glittery, and therefore, gold foil or silver foil is often used for printed matter accompanying celebratory events or the like.

By the techniques described above, it is necessary to create a bitmap image in which the portion to be coated with varnish is marked beforehand in black, and set the bitmap image in a foil stamping device, which requires time and effort. Moreover, in foil stamping, foil is pressed by a foil plate against a portion coated with varnish. Therefore, the device becomes large in size. As described above, creating foil-stamped printed matter requires a lot of time and effort, and a foil stamping device that uses a foil plate is expensive. Therefore, it is common to place an order with a specialized manufacturer. However, to readily create foil-stamped printed matter at lower costs, studies have been recently made on a system that forms a toner layer or an ink layer as a foundation layer, and performs foil stamping on the foundation layer.

For example, JP 2000-015944 A discloses a printer that includes: a character image forming unit that forms an electronic image signal of a character or the like to be printed by foil stamping; a character printing unit that prints a character or the like with toner on a material that is to form the cover of a book, in accordance with a character or the like formed from the electronic image signal; and a foil bonding unit that puts a foil sheet having high adhesiveness to toner on the cover material on which the character or the like has been printed, and thermally presses the foil sheet against the cover material.

Further, JP 5691909 B1 discloses a foil image formation method for forming a foil image by bringing foil into contact with a foil bonding toner layer thermally fixed onto an image support by an electrophotographic method using toner containing a thermoplastic resin, heating a selected area of the foil with a thermal head, and bonding the foil onto the foil bonding toner layer.

As in JP 2000-015944 A and JP 5691909 B1, a toner layer is formed as a foundation layer, and foil is bonded onto the toner layer, so that foil-stamped printed matter can be readily created at low costs. However, a toner layer and an ink layer are normally flat, and accordingly, the surface of foil bonded onto a toner layer or an ink layer is also flat. Therefore, foil cannot have a concave portion and a convex portion formed therein, as in a case where foil pressure bonding is performed with a foil plate. Because of this, there is a problem that the same texture as that created by a foil stamping device using a foil plate cannot be achieved only with a toner layer or an ink layer formed as a foundation layer.

SUMMARY

The present invention has been made in view of the above problems, and its main object is to provide a printed matter foil stamping system, a foil stamping print control method, and a foil stamping print control program with which the same texture as the texture of foil formed by a foil stamping device using a foil plate, even in a case where foil stamping is performed on a toner layer or an ink layer as a foundation layer in a system that performs foil stamping of gold foil or silver foil at any desired position on printed matter.

To achieve the abovementioned object, according to an aspect of the present invention, a printed matter foil stamping system reflecting one aspect of the present invention comprises: a printing device that forms a toner layer or an ink layer on a paper sheet in accordance with print data; and a foil stamping device that performs foil stamping on the toner layer or the ink layer, wherein the printing device or a control device that controls the printing device includes a hardware processor that generates print data capable of forming a portion in which a thickness of the toner layer or the ink layer is relatively large and a portion in which the thickness is relatively small in an area in which foil stamping is to be performed, and, in accordance with the print data, the printing device forms the toner layer or the ink layer having a portion with a relatively large thickness and a portion with a relatively small thickness on the paper sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 19 is a diagram showing an example configuration of a printed matter foil stamping system according to a sixth embodiment of the present invention.

DETAILED DESCRIPTION OF EMBODIMENTS

Hereinafter, one or more embodiments of the present invention will be described with reference to the drawings. However, the scope of the invention is not limited to the disclosed embodiments.

As mentioned in the Description of the Related Art, a technique for forming a varnish coating or performing foil stamping is known as a method of creating printed matter having an additional value. By this technique, creating foil-stamped printed matter requires a lot of time and effort, and a foil stamping device that uses a foil plate is expensive. Therefore, it is common to place an order with a specialized manufacturer. However, to readily create foil-stamped printed matter at lower costs, studies have been recently made on a system that forms a toner layer or an ink layer as a foundation layer, and performs foil stamping on the foundation layer.

However, a toner layer and an ink layer are normally flat, and therefore, the surface of foil bonded onto a toner layer or an ink layer is also flat, and a concave portion and a convex portion cannot be formed in foil as in a case where foil pressure bonding is performed with a foil plate. Because of this, there is a problem that the same texture as that created by a foil stamping device using a foil plate cannot be achieved only with a toner layer or an ink layer formed as a foundation layer. This problem is now described with reference to the drawings.

Figure 1:
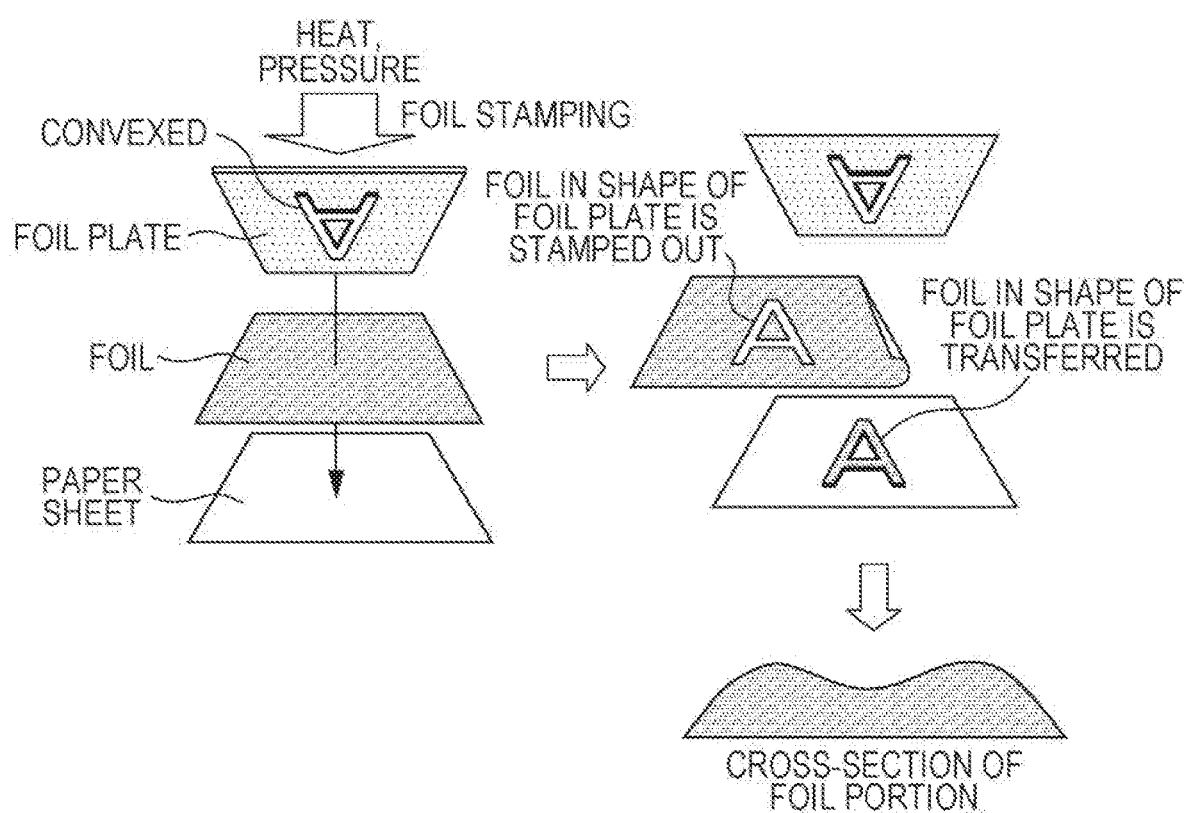
FIG. 1 is a schematic diagram for explaining a conventional foil stamping method (a method of performing foil stamping using a foil plate)

FIG. 1 is a schematic diagram for explaining a conventional foil stamping method that uses a foil plate. By this method, foil such as gold foil or silver foil is placed on a paper sheet coated with varnish, and a foil plate having a convex foil image is pressed against the foil with heat or pressure. After that, the foil is peeled off, so that the foil in the shape of the foil plate is stamped out, and is transferred onto the paper sheet. As this foil stamping device presses foil with a foil plate, the cross-sectional shape of the foil portion has a thickness that is small at the edge portion, gradually increases, and again decreases at the central portion, so that the central portion becomes a slightly concave portion. Thus, foil with an excellent texture is formed.

Figure 2:
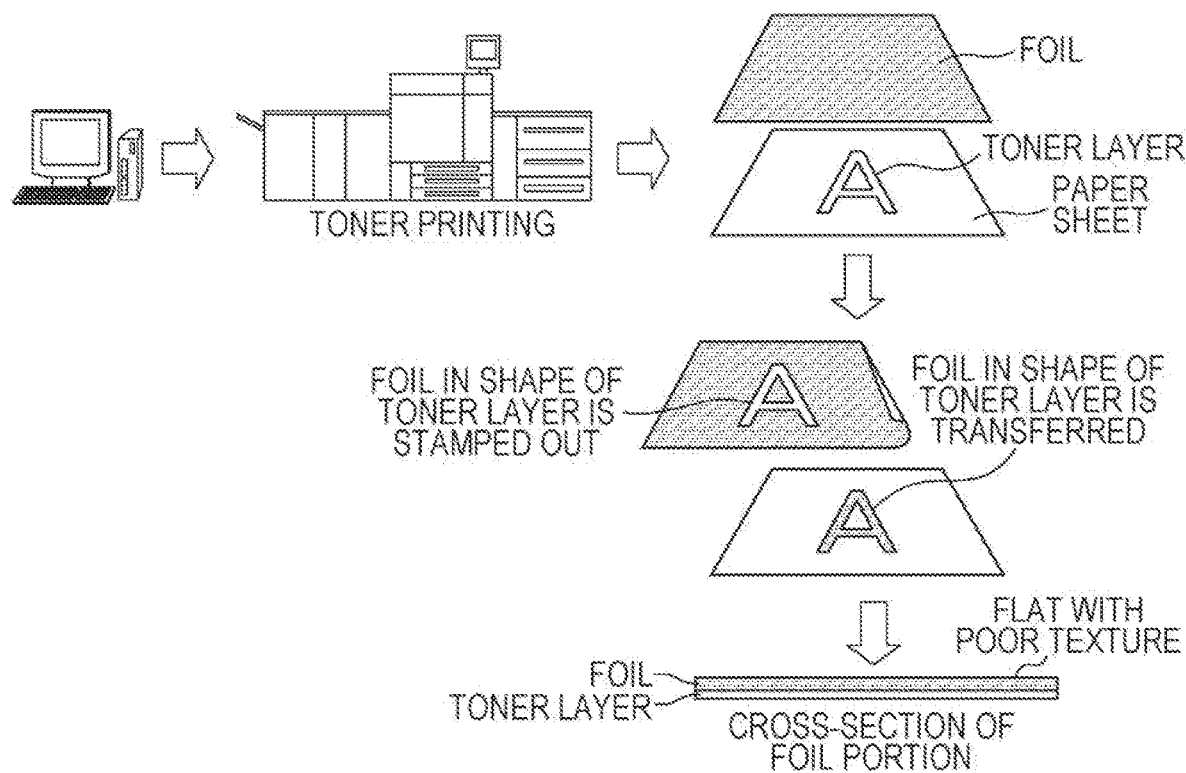
FIG. 2 is a schematic diagram for explaining a conventional foil stamping method (a method of performing foil stamping on a toner layer)

FIG. 2 is a schematic diagram for explaining a conventional foil stamping method for performing foil stamping on a toner layer. By this method, a printing device forms a toner layer on a portion at which foil is to be left. After the foil is placed on and pressed against the toner layer, the foil is peeled off, so that foil in the shape of the toner layer is stamped out, and is transferred onto a paper sheet. By this method, however, foil is bonded onto a thin, flat toner layer. Therefore, the cross-sectional shape of the foil portion is also flat, and only foil with poor texture can be formed.

Figure 3:
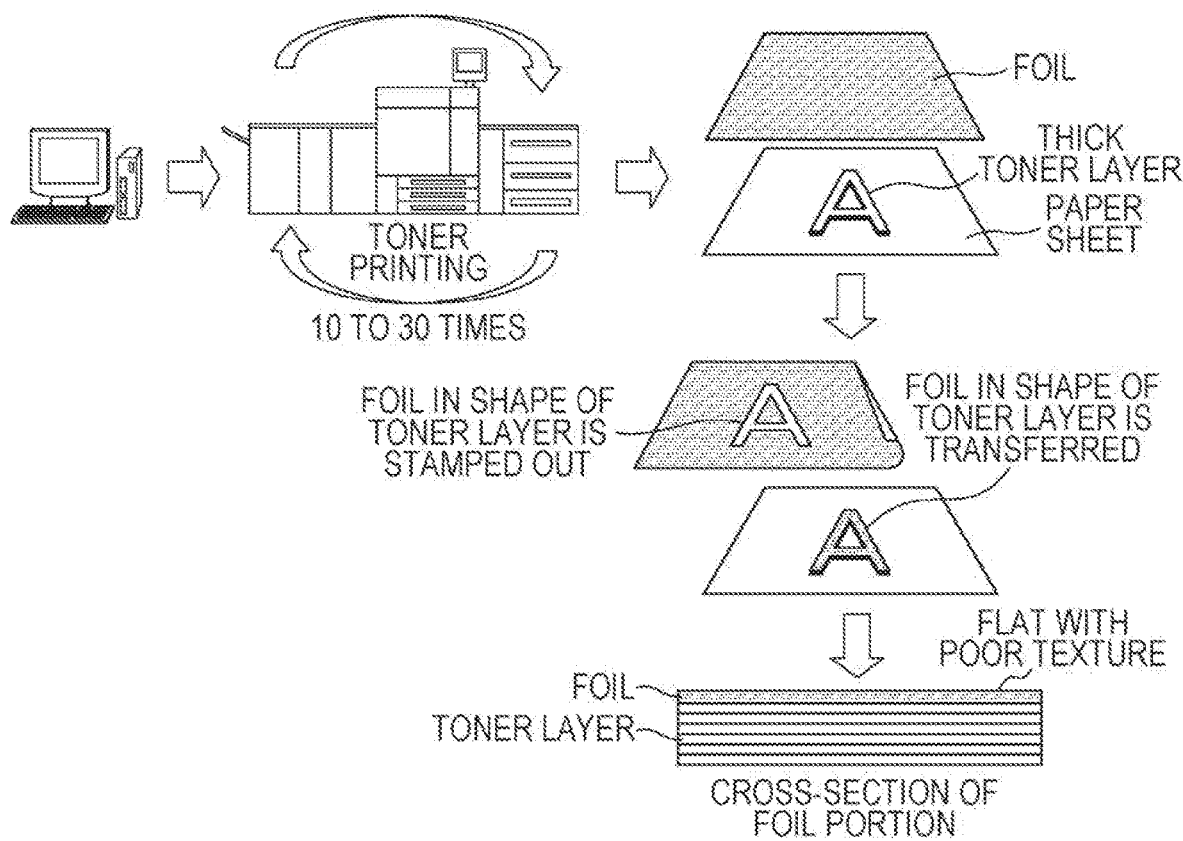
FIG. 3 is a schematic diagram for explaining a foil stamping method (a method of performing foil stamping on a thick toner layer)

To counter this problem, it is possible to adopt a method of increasing the thickness of a toner layer by printing toner layers in an overlapping manner on a portion at which foil is to be left, as shown in FIG. 3, using a printing device. By this method, after the foil is placed on and pressed against the thickened toner layer, the foil is peeled off, so that foil in the shape of the toner layer is stamped out, and is transferred onto a paper sheet. By this method, however, foil is bonded onto a flat toner layer. Therefore, the cross-sectional shape of the foil portion is also flat, and only foil with poor texture can be formed.

Figure 4:
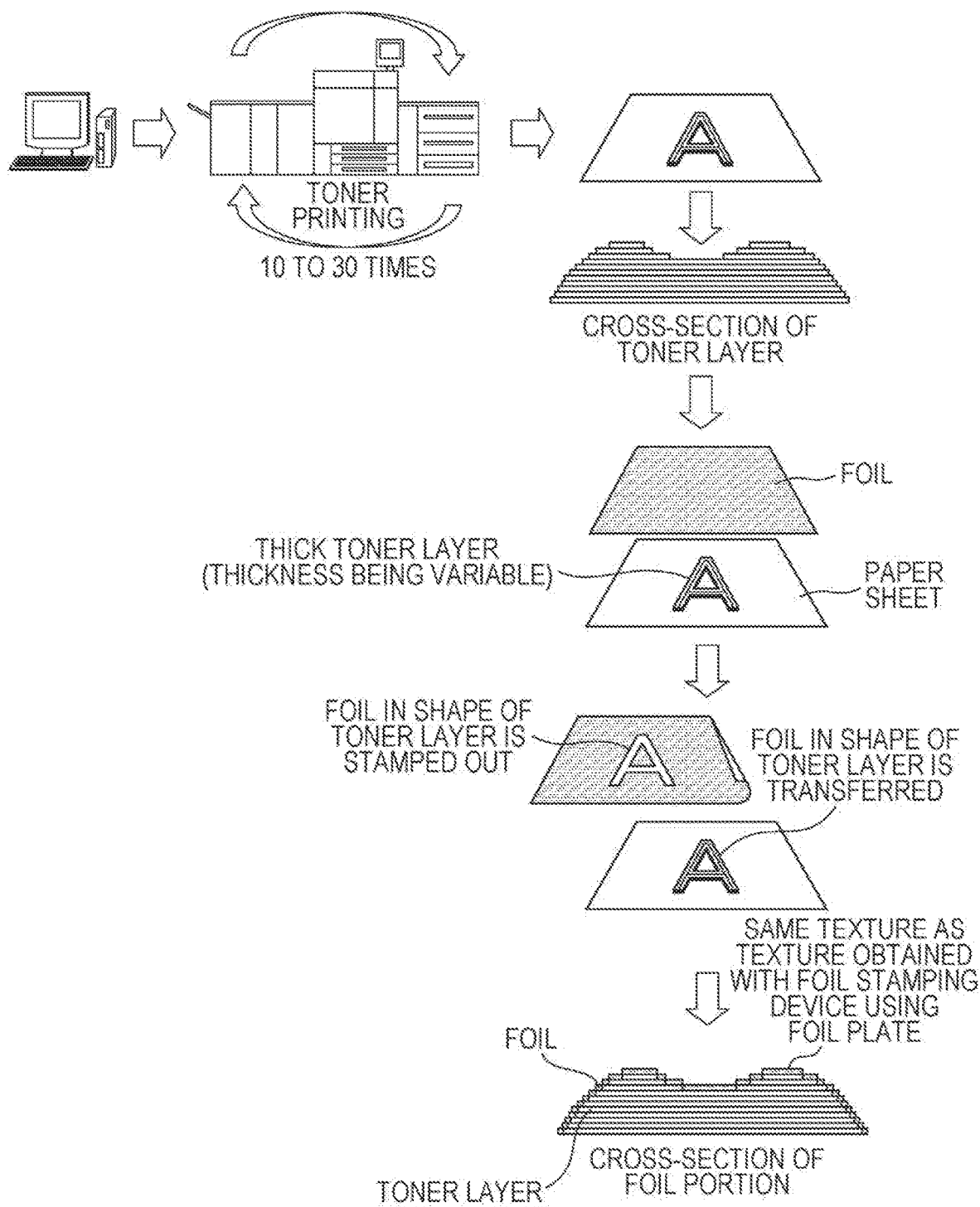
FIG. 4 is a schematic diagram for explaining a foil stamping method (a method of performing foil stamping on a toner layer having its thickness varied) according to an embodiment of the present invention.

Therefore, according to an embodiment of the present invention, in a printed matter foil stamping system including a printing device that forms a toner layer or an ink layer on a paper sheet in accordance with print data, and a foil stamping device that performs foil stamping on the toner layer or the ink layer, the printing device or a control device that controls the printing device generates print data capable of forming a portion in which the thickness of the toner layer or the ink layer is relatively large and a portion in which the thickness is relatively small in the area in which foil stamping is to be performed, and the printing device forms the toner layer or the ink layer having a portion with a relatively large thickness and a portion with a relatively small thickness on the paper sheet, in accordance with the print data. For example, to keep the thickness of a toner layer or an ink layer from becoming uniform even in a uniform-density image (or to vary the thickness of a toner layer or an ink layer even when the image density is uniform), a portion having a greater thickness than the thickness equivalent to the uniform density is formed. Specifically, as shown in FIG. 4, when a toner layer as a foundation layer is printed in an overlapping manner, the toner layer formation region is varied for each overlapping layer, so that a portion having a relatively large thickness and a portion having a relatively small thickness are formed in the toner layer.

By this method, foil is bonded onto a toner layer or an ink layer having a portion with a relatively large thickness and a portion with a relatively small thickness (having a concave portion and a convex portion). Accordingly, the cross-sectional shape of the foil portion reflects the concave portion and the convex portion of the toner layer, and thus, foil with an excellent texture can be formed. Note that the degree of unevenness of a toner layer can be appropriately changed in accordance with the desired texture. However, in a case where the concave portion is set as 100%, the convex portion is normally controlled in the range of 150% to 500%, so that a difference in texture can be generated. Further, the edge portion protrudes, while the central portion is concaved. Thus, a texture similar to that obtained with a foil stamping device using a foil plate can be obtained.

First Embodiment

Figure 5:
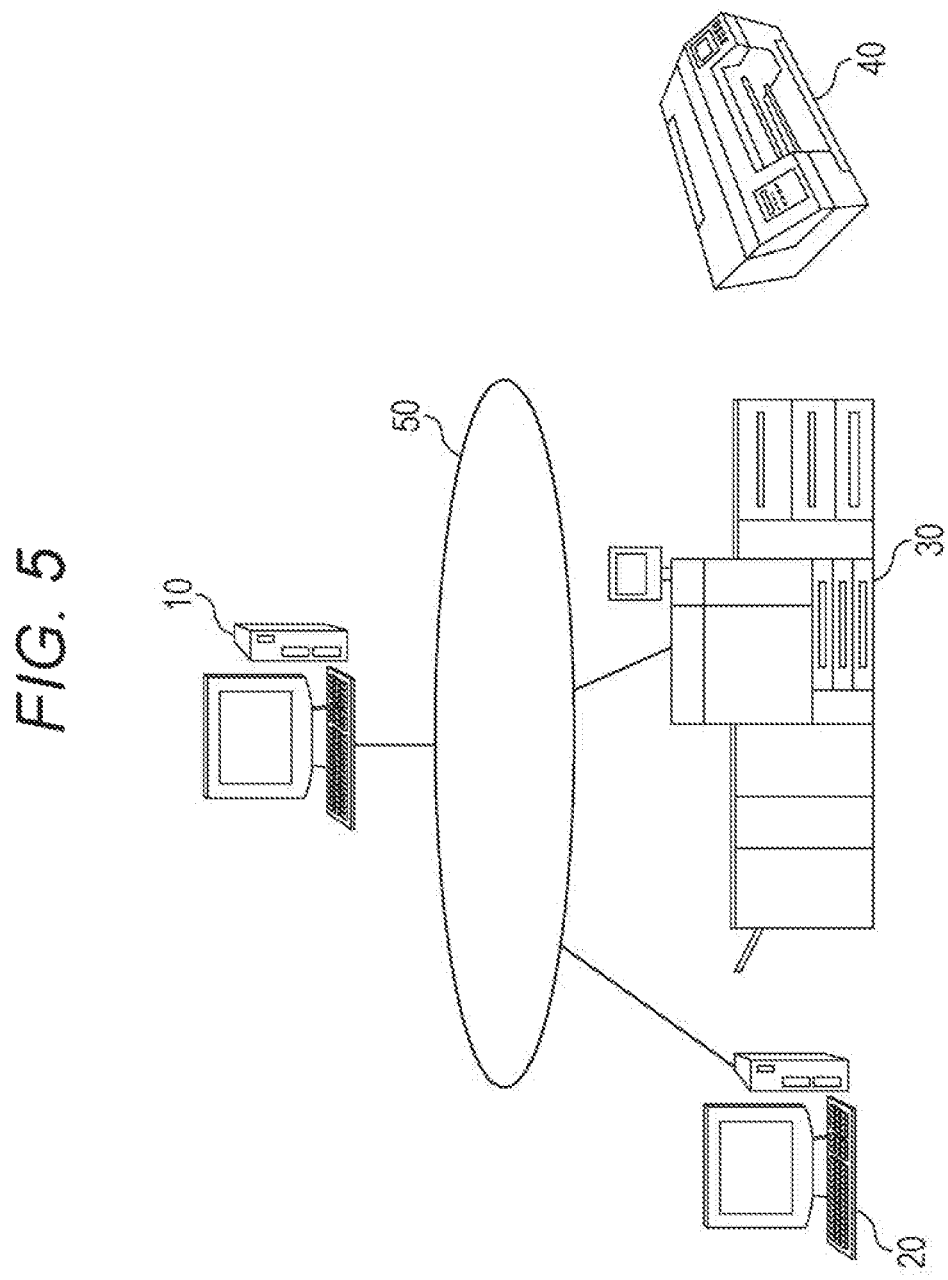
FIG. 5 is a diagram showing an example configuration of a printed matter foil stamping system according to a first embodiment of the present invention.
Figure 8:
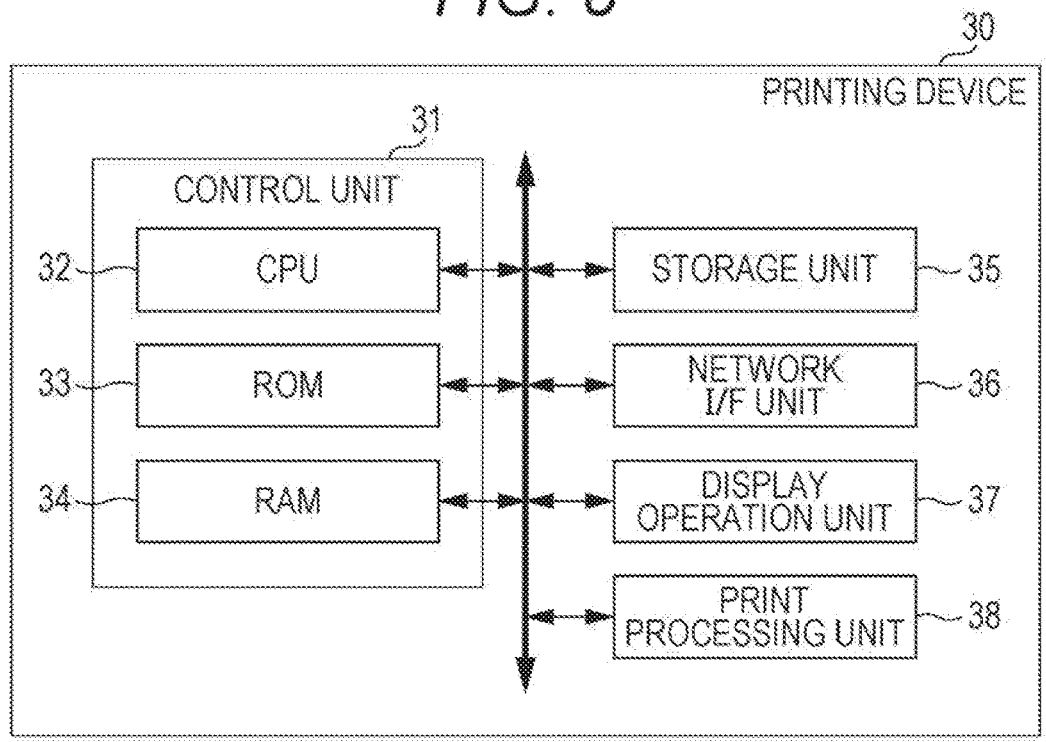
FIG. 8 is a block diagram showing the configuration of a printing device according to the first embodiment of the present invention.
Figure 9:
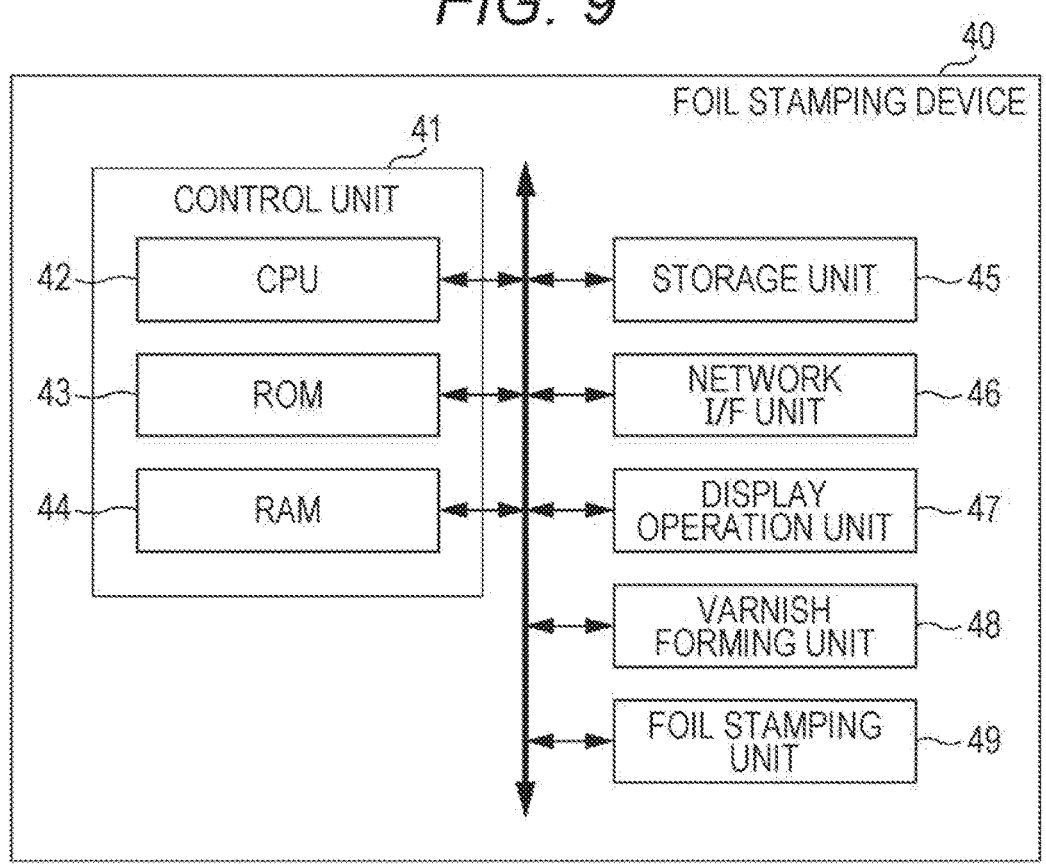
FIG. 9 is a block diagram showing the configuration of a foil stamping device according to the first embodiment of the present invention.
Figure 10:
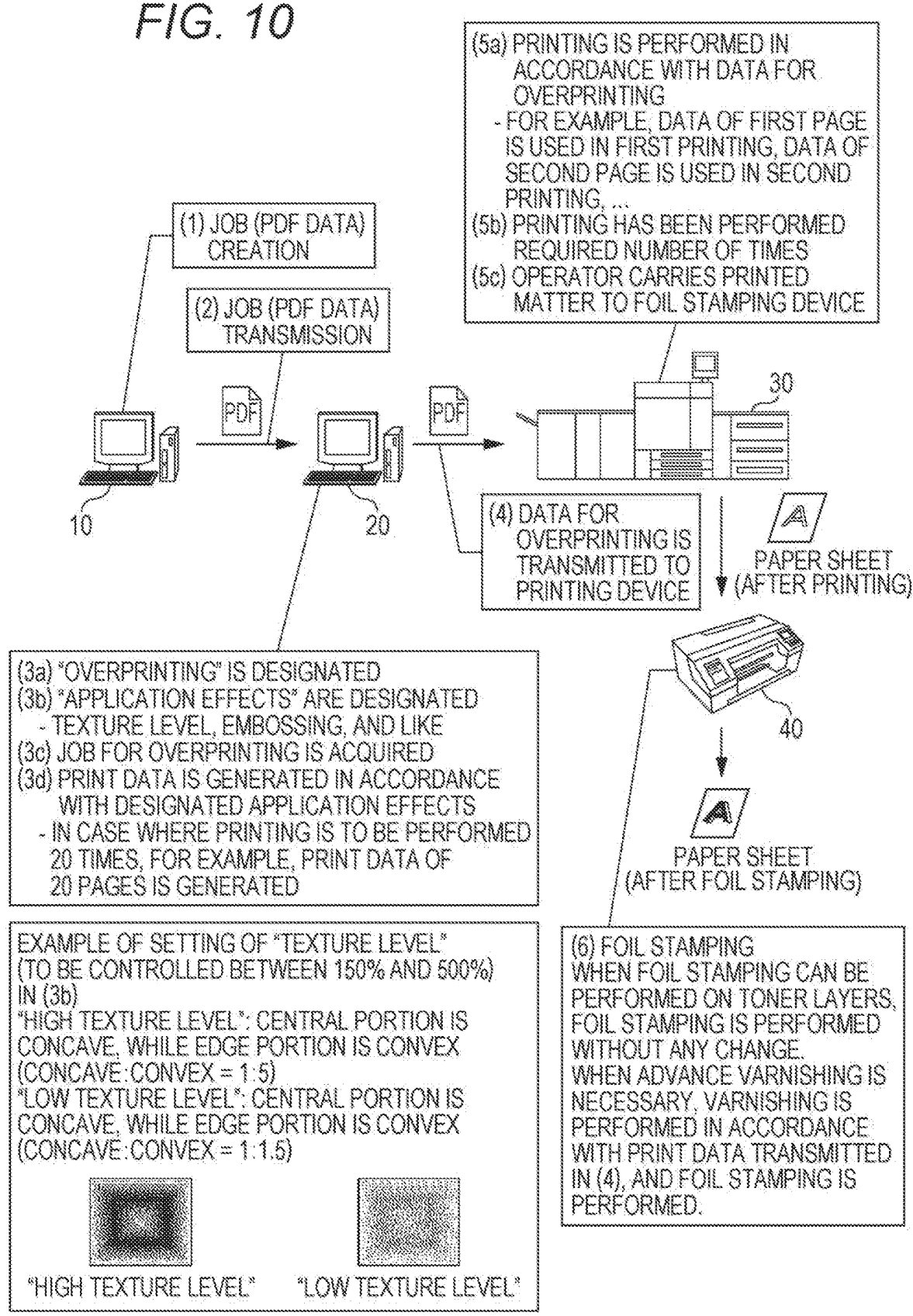
FIG. 10 is a schematic diagram roughly showing operation of the printed matter foil stamping system according to the first embodiment of the present invention.
Figure 11:
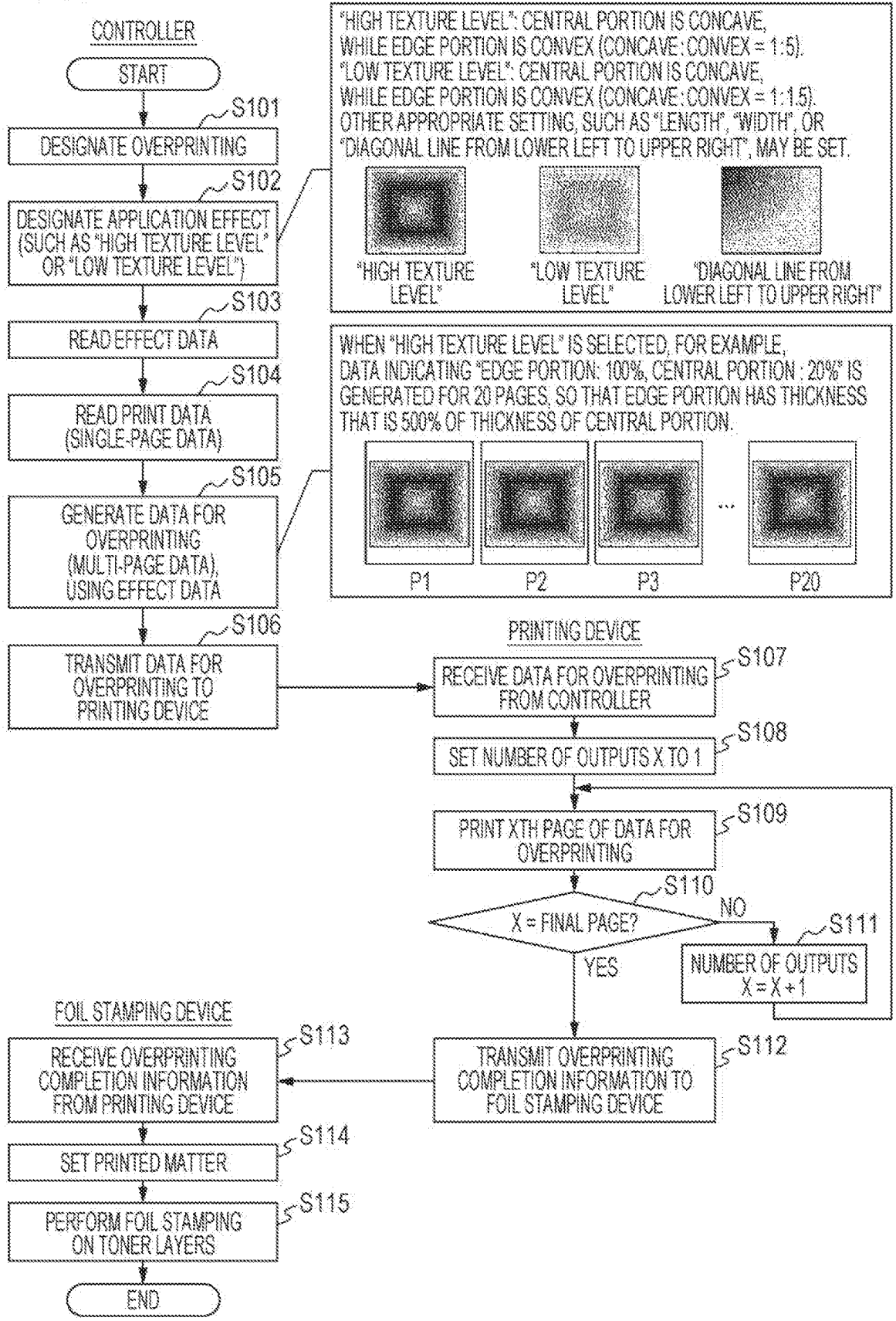
FIG. 11 is a flowchart showing the operation of the printed matter foil stamping system according to the first embodiment of the present invention.

To explain the above described embodiment of the present invention in greater detail, a printed matter foil stamping system, a foil stamping print control method, and a foil stamping print control program according to a first embodiment of the present invention are described, with reference to FIGS. 5 through 12C. FIG. 5 is a diagram showing an example configuration of the printed matter foil stamping system according to this embodiment. FIGS. 6A through 9 are block diagrams showing the respective configurations of a job creation device, a controller, a printing device, and a foil stamping device. FIG. 10 is a schematic diagram schematically showing operation of the printed matter foil stamping system of this embodiment. FIG. 11 is a flowchart showing the operation of the printed matter foil stamping system of this embodiment. 12A through 12C are schematic views of variations of toner layer structures of this embodiment.

As shown in FIG. 5, the printed matter foil stamping system according to this embodiment includes a job creation device 10 that generates and transmits a job, a controller 20 that processes the job and generates print data, a printing device 30 that forms a toner layer or an ink layer (in this embodiment, a toner layer is formed) on a paper sheet in accordance with the print data, and a foil stamping device 40 that performs foil stamping on the toner layer. The job creation device 10, the controller 20, and the printing device 30, as well as the foil stamping device 40 if necessary, are connected by a communication network 50, such as Ethernet (registered trademark), a token ring, or a local area network (LAN) or a wide area network (WAN) specified in standards such as Fiber-Distributed Data Interface (FDDI).

The controller 20 and the printing device 30 may be connected by a line dedicated for peripheral component interconnect (PCI) connection or the like. Further, although the printed matter foil stamping system includes the job creation device 10, the controller 20, the printing device 30, and the foil stamping device 40 in FIG. 5, the controller 20 may not be included, if the functions of the controller 20 can be realized by the job creation device 10 or the printing device 30. In the description below, the respective devices are explained in detail on the basis of the configuration shown in FIG. 5.

[Job Creation Device]

Figure 6A:
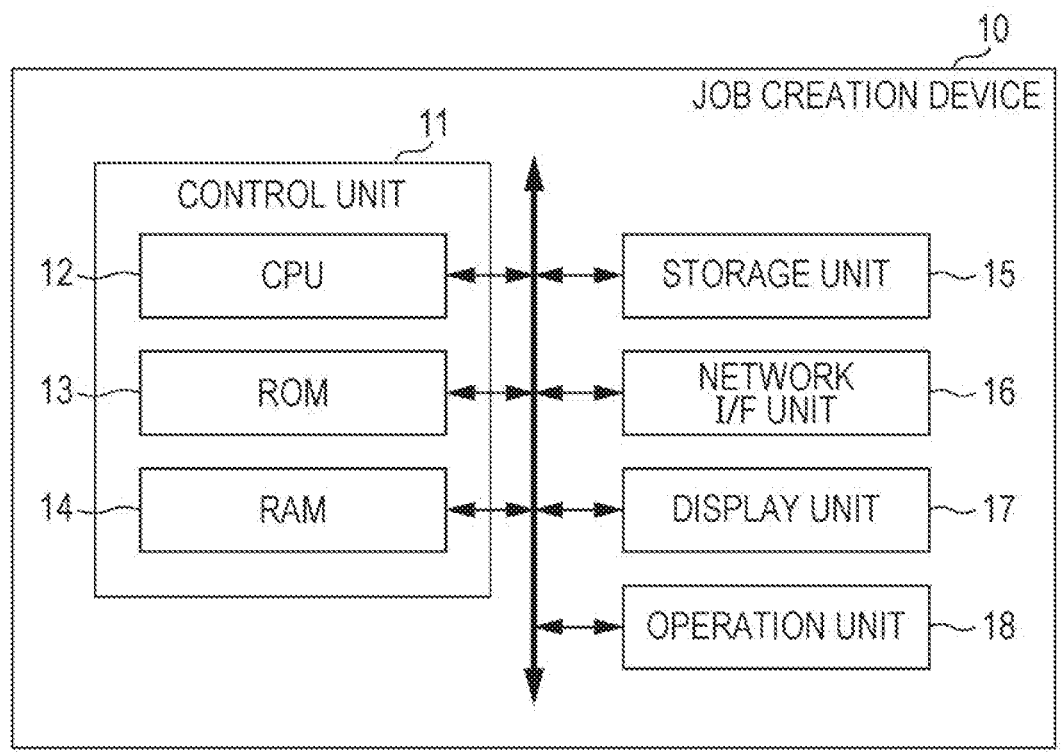
FIGS. 6A and 6B are block diagrams showing the configuration of a job creation device according to the first embodiment of the present invention.

The job creation device 10 is a computer device (A client device) such as a personal computer. The job creation device 10 generates a job, and transmits the job to the controller 20. As shown in FIG. 6A, the job creation device 10 includes a control unit 11, a storage unit 15, a network interface unit 16, a display unit 17, and an operation unit 18.

Figure 6B:
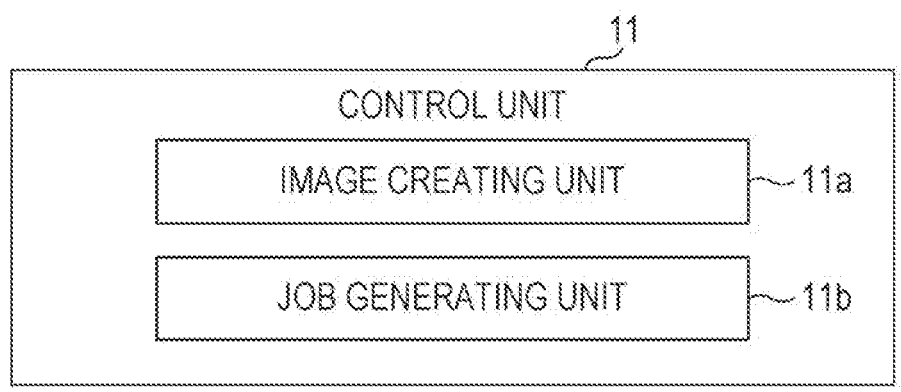

The control unit 11 includes a central processing unit (CPU) 12 and memories such as a read only memory (ROM) 13 and a random access memory (RAM) 14. The CPU 12 controls the entire operation of the job creation device 10 by loading a control program stored in the ROM 13 or the storage unit 15 into the RAM 14, and executing the control program. As shown in FIG. 6B, the control unit 11 functions as an image creating unit 11a, a job generating unit 11b, and the like.

The image creating unit 11a is an application that creates a foil image formed by foil stamping.

The job generating unit 11b generates a job such as Portable Document Format (PDF) data for issuing an instruction to form a toner layer according to the foil image, and outputs the generated job to the controller 20.

The storage unit 15 is formed with a hard disk drive (HDD), a solid state drive (SSD), or the like, and stores a program for the CPU 12 to control the respective components, information about the processing functions of the device, a job, and the like.

The network interface unit 16 is formed with a network interface card (NIC), a modem, or the like. The network interface unit 16 connects the job creation device 10 to the communication network 50, to enable the job creation device 10 to transmit a job to the controller 20.

The display unit 17 is formed with a liquid crystal display (LCD), an organic electroluminescence (EL) display device, or the like, and displays a screen for the above application, a job screen, or the like.

The operation unit 18 is formed with a mouse, a keyboard, and the like, and enables operations such as foil image creation and job generation/transmission.

[Controller]

Figure 7A:
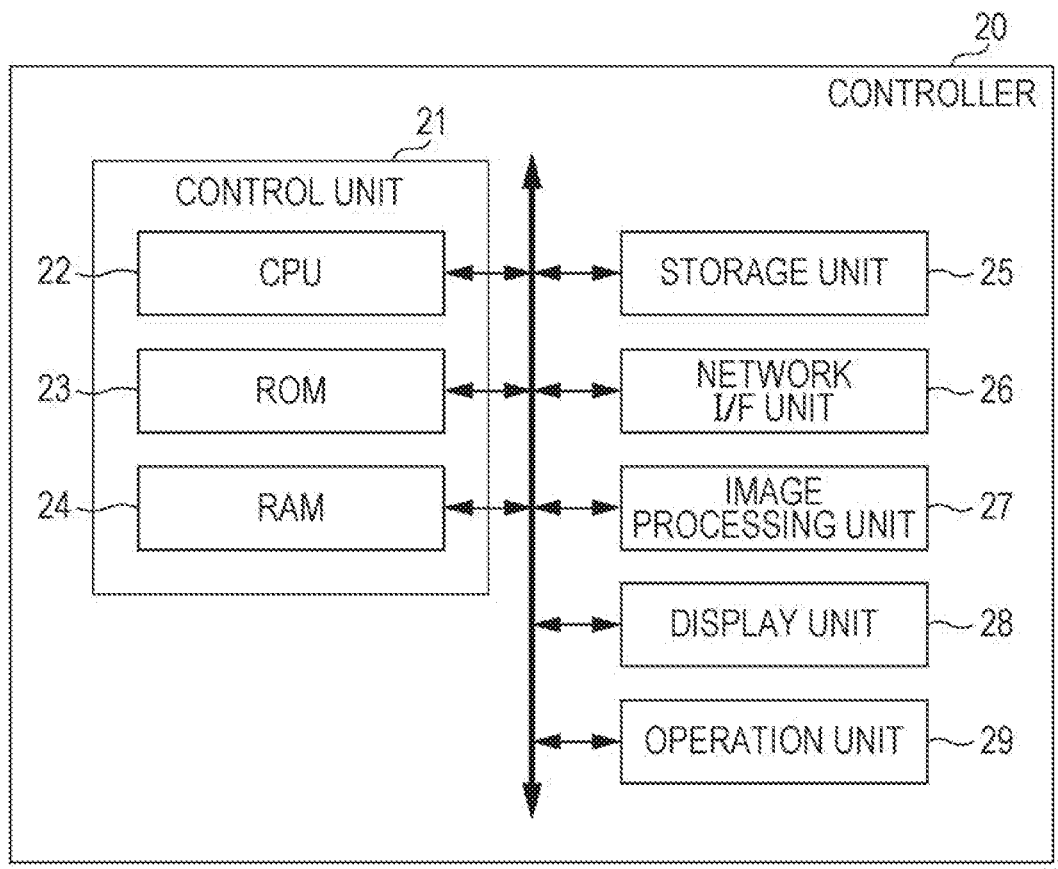
FIGS. 7A and 7B are block diagrams showing the configuration of a controller according to the first embodiment of the present invention.

The controller 20 is a printer controller, a printer server, or the like, receives a job from the job creation device 10, and transmits print data to the printing device 30. As shown in FIG. 7A, the controller 20 includes a control unit 21, a storage unit 25, a network interface unit 26, an image processing unit 27, a display unit 28, and an operation unit 29.

Figure 7B:
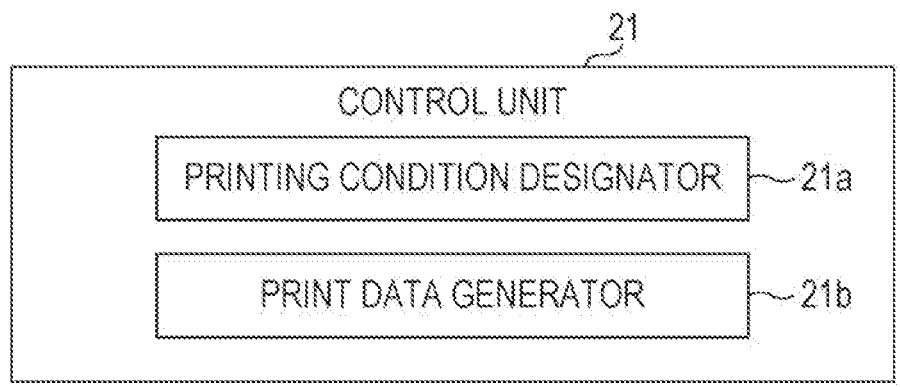

The control unit 21 includes a CPU 22 and memories such as a ROM 23 and a RAM 24. The CPU 22 controls the entire operation of the controller 20 by loading a control program stored in the ROM 23 or the storage unit 25 into the RAM 24, and executing the control program. As shown in FIG. 7B, the control unit 21 functions as a printing condition designator 21a, a print data generator 21b, and the like.

The printing condition designator 21a enables overprinting designation for specifying whether to perform overprinting for printing a toner layer in an overlapping manner, and application effect designation for specifying an effect in accordance with the shape of the toner layer.

The print data generator 21b generates print data such that a portion in which the thickness of the toner layer is relatively large, and a portion in which the thickness is relatively small can be formed within the area in which foil stamping is to be performed. Specifically, printing data (called data for overprinting) is generated so that effect data corresponding to a designated effect is applied to a foil image in a job, to vary the thickness of the toner layer between the edge portion and the central portion of the area in which foil stamping is to be performed. For example, within the area in which foil stamping is to be performed, data for overprinting in which the amount of toner application is varied is generated, or data for overprinting for a plurality of pages among which the toner application amount distribution is varied is generated.

The printing condition designator 21a and the print data generator 21b may be formed as hardware, or may be formed as a foil stamping print control program for causing the control unit 21 to function as the printing condition designator 21a and the print data generator 21b. The foil stamping print control program may be executed by the CPU 22.

The storage unit 25 is formed with an HDD, an SSD, or the like, and stores a program for the CPU 22 to control the respective components, a job received from the job creation device 10, print data generated by the print data generator 21b, an application effect library that associates application effects with effect data, and the like.

The network interface unit 26 is formed with an NIC, a modem, or the like. The network interface unit 26 connects the controller 20 to the communication network 50, receives a job from the job creation device 10, and transmits print data to the printing device 30.

The image processing unit 27 functions as a raster image processor (RIP), to generate intermediate data by translating a job, and generate print data in a bitmap format by performing rendering (this series of processes is referred to as the RIP process). The image processing unit 27 also performs screen processing, tone correction, density balance adjustment, thinning, halftone dot processing, and the like on this print data, as necessary.

The display unit 28 is formed with a liquid crystal display device, an organic EL display device, or the like, and displays a screen for performing overprinting designation or application effect designation, in accordance with an instruction from the printing condition designator 21a.

The operation unit 29 is formed a mouse, a keyboard, and the like, and enables operations such as overprinting designation or application effect designation on the screen described above.

[Printing Device]

The printing device 30 is multi-functional peripherals (MFP) or the like capable of toner overprinting, and performs a printing process in accordance with print data (data for overprinting) received from the controller 20. As shown in FIG. 8, the printing device 30 includes a control unit 31, a storage unit 35, a network interface unit 36, a display operation unit 37, and a print processing unit 38.

The control unit 31 includes a CPU 32 and memories such as a ROM 33 and a RAM 34. The CPU 32 controls the entire operation of the printing device 30 by loading a control program stored in the ROM 33 or the storage unit 35 into the RAM 34, and executing the control program. In this embodiment, when overprinting is designated, the control unit 31 counts the number of times printing has been performed, so that printing is repeated until the designated application effect is achieved.

The storage unit 35 is formed with an HDD, an SSD, or the like, and stores a program for the CPU 32 to control the respective components, information about the processing functions of the device, data for overprinting received from the controller 20, and the like.

The network interface unit 36 is formed with an NIC, a modem, or the like. The network interface unit 36 connects the printing device 30 to the communication network 50, receives data for overprinting from the controller 20, and transmits information (overprinting completion information) indicating that overprinting has been completed, to the foil stamping device 40.

The display operation unit 37 is a touch panel or the like that includes a pressure-sensitive operation unit (a touch sensor) in which transparent electrodes are arranged in a grid-like pattern on a display unit. The display operation unit 37 displays various screens related to a printing process, to enable various operations related to the printing process.

The print processing unit 38 sequentially forms a toner layer in accordance with print data (data for overprinting). The print processing unit 38 includes: an image forming unit that includes exposing units that perform exposure by emitting laser light in accordance with print data, for example, toner bottles filled with toners of the respective colors of CMYK, photosensitive drums, developing units, charging units, photosensitive member cleaning units, and primary transfer rollers, and forms toner images in the respective colors of CMYK; an intermediate belt that is rotated by rollers and functions as an intermediate transfer member that conveys the toner images formed by the image forming unit onto a paper sheet; a secondary transfer roller that transfers the toner images formed on the intermediate belt onto the paper sheet; a fixing unit that fixes the toner images transferred onto the paper sheet; a sheet feed tray that supplies paper sheets; a sheet catch tray onto which paper sheets are ejected; and a conveying unit including sheet feed rollers for conveying paper sheets, resist rollers, loop rollers, reverse rollers, and sheet ejecting rollers.

The toners used in this embodiment are preferably toners that functions as an adhesive for bonding foil onto the toner layer, and may include a binder resin containing a thermoplastic resin. Examples of thermoplastic resins that can be used as the above thermoplastic resin include known thermoplastic resins such as styrene resins, (meth)acrylic resins, styrene-(meth)acrylic copolymer resins, vinyl resins such as olefin resins, polyester resins, polyamide resins, polycarbonate resins, polyether, polyvinyl acetate resins, polysulfone resins, and polyurethane resins. One of these resins or a combination of two or more of these resins may be used.

[Foil Stamping Device]

The foil stamping device 40 performs foil stamping on a paper sheet output by the printing device 30. As shown in FIG. 9, the foil stamping device 40 includes a control unit 41, a storage unit 45, a network interface unit 46, a display operation unit 47, a varnish forming unit 48, and a foil stamping unit 49.

The control unit 41 includes a CPU 42 and memories such as a ROM 43 and a RAM 44. The CPU 42 controls the entire operation of the foil stamping device 40 by loading a control program stored in the ROM 43 or the storage unit 45 into the RAM 44, and executing the control program.

The storage unit 45 is formed with an HDD, an SSD, or the like, and stores a program for the CPU 42 to control the respective components, information about the processing functions of the device, and the like.

The network interface unit 46 is formed with an NIC, a modem, or the like. The network interface unit 46 connects the foil stamping device 40 to the communication network 50, and receives overprinting completion information from the printing device 30.

The display operation unit 47 is a touch panel or the like that includes a pressure-sensitive operation unit (a touch sensor) in which transparent electrodes are arranged in a grid-like pattern on a display unit. The display operation unit 47 displays various screens related to a foil stamping process, to enable various operations related to the foil stamping process.

The varnish forming unit 48 applies an adhesive such as varnish to the area defined by the print data, as necessary, on a paper sheet that has been subjected to printing and been output by the printing device 30.

The foil stamping unit 49 includes a loading means that can be loaded with one or more foil rolls, with its axis being a direction orthogonal to the sheet conveying direction. After bonding foil supplied from the foil roll onto a toner layer formed on a paper sheet, the foil stamping unit 49 peels off the foil, to transfer the foil in the shape of the toner layer onto the paper sheet.

It should be noted that FIGS. 5 through 9 show an example of a printed matter foil stamping system according to this embodiment, and the configurations of the respective devices and control on the devices may be changed as appropriate.

For example, in FIG. 5, the controller 20, the printing device 30, and the foil stamping device 40 are separate devices. However, the controller 20, the printing device 30, and the foil stamping device 40 may be formed as one device, the controller 20 and the printing device 30 may be formed as one device, or the printing device 30 and the foil stamping device 40 may be formed as one device.

Further, in FIGS. 7A and 7B, the control unit 21 of the controller 20 functions as the printing condition designator 21*a* and the print data generator 21*b* (the CPU 22 of the controller 20 executes the foil stamping print control program). However, the control unit 31 of the printing device 30 may function as a printing condition designator and a print data generator (the CPU 32 of the printing device 30 may execute the foil stamping print control program).

Next, operation of the printed matter foil stamping system having the above described configuration is roughly described, with reference to the schematic diagram shown in FIG. 10.

In the job creation device 10, the control unit 11 (the job generating unit 11*b*) creates a job such as PDF data, and transmits this job to the controller 20 (see (1) and (2) in FIG. 10).

In the controller 20, the control unit 21 (the printing condition designator 21*a*) receives designation of overprinting, and designation of an application effect such as a texture level or embossing (see (3*a*) and (3*b*) in FIG. 10). It should be noted that the texture level is preferably controlled in the range of 150% to 500%. For example, in the case of a "high texture level", the central portion is concave, the edge portion is convex, and the thickness ratio between the concave portion and the convex portion is 1:5. In the case of a "low texture level", the central portion is concave, the edge portion is convex, and the thickness ratio between the concave portion and the convex portion is 1:1.5, for example.

The control unit 21 (the print data generator 21*b*) then acquires a job for overprinting from the job creation device 10, and generates print data (data for overprinting) in accordance with the designated application effect (see (3*c*) and (3*d*) in FIG. 10). For example, in a case where printing is to be performed 20 times, data for overprinting of 20 pages among which the application position image is varied is created. The generated data for overprinting is then transmitted to the printing device 30 (see (4) in FIG. 10).

In the printing device 30, the print processing unit 38 forms a toner layer on a paper sheet in accordance with the data for overprinting (see (5*a*) in FIG. 10). For example, the data for overprinting of the first page is used in the first toner layer formation, and the data for overprinting of the second page is used in the second toner layer formation. The print processing unit 38 then determines whether the required number of times printing has been performed. If printing has been performed the required number of times, the operator carries the printed matter to the foil stamping device 40 (see (5*b*) and (5*c*) in FIG. 10).

In the foil stamping device 40, if it is possible to perform foil stamping on the toner layer, the foil stamping unit 49 performs foil stamping without any change. If advance varnishing is necessary, the varnish forming unit 48 applies an adhesive such as varnish onto the area defined by the print data, and the foil stamping unit 49 then performs foil stamping (see (6) in FIG. 10).

Next, the operation of the printed matter foil stamping system of this embodiment is described in detail. The CPU 22 of the controller 20 loads the foil stamping print control program stored in the ROM 23 or the storage unit 25 into the RAM 24, and executes the foil stamping print control program, to perform the processes in the respective steps shown in the flowchart in FIG. 11.

First, in the controller 20, the control unit 21 (the printing condition designator 21*a*) receives designation of overprinting (S101), and designation of an application effect such as a texture level or embossing (S102). As described above, in the case of a "high texture level", the central portion is concave, the edge portion is convex, and the thickness ratio between the concave portion and the convex portion is 1:5, for example. In the case of a "low texture level", the central portion is concave, the edge portion is convex, and the thickness ratio between the concave portion and the convex portion is 1:1.5, for example. Although an application effect to vary the layer thickness between the central portion and the edge portion is described as an example herein, it is also possible to designate any appropriate application effect related to length, width, a diagonal line from lower left to upper right, or the like. Further, in a case where a predetermined effect is applied, S102 may be skipped. The effect data corresponding to the designated application effect is then read from an application effect library or the like (S103).

Next, the control unit 21 (the print data generator 21*b*) reads print data (single-page data) generated by the image processing unit 27 in accordance with a job received from the job creation device 10 (S104). Using the effect data read in S103, the control unit 21 generates data for overprinting (multi-page data) (S105). For example, when a "high texture level" is selected as an application effect, 100% of the data of 20 pages is created at the edge portion, while 20% of the data of the 20 pages is created at the central portion, so that data for overprinting in which the edge portion has a thickness that is 500% of the thickness of the central portion can be generated. After that, the control unit 21 (the print data generator 21*b*) transmits the generated data for overprinting to the printing device 30 (S106).

In the printing device 30, when the data for overprinting is received from the controller 20 (S107), the control unit 31 sets the number of outputs (X) to 1 (S108), and instructs the print processing unit 38 to perform printing of the Xth page of the data for overprinting (S109). The control unit 31 then determines whether X is the final page (S110). If X is not the final page (No in S110), the control unit 31 increments the number of outputs (X) by 1 (S111), and then returns to S109, to instruct the print processing unit 38 to perform printing of the Xth page. When X is the final page (Yes in S110), the control unit 31 transmits overprinting completion information to the foil stamping device 40 (S112).

Figure 12A:
FIGS. 12A through 12C are schematic views of variations of toner layer structures according to the first embodiment of the present invention.
Figure 12B:
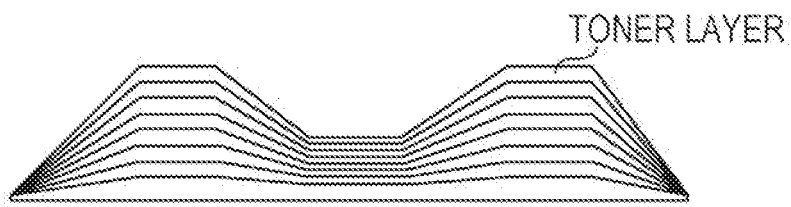
Figure 12C:
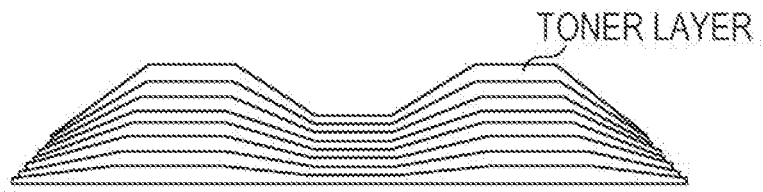

FIGS. 12A through 12C show example structures of toner layers formed by overprinting. Specifically, FIG. 12A shows an example case where the configuration of each layer is varied between the portion to which toner is applied and the portion to which toner is not applied. FIG. 12B shows an example case where the distribution of the toner application amount is the same in all layers. FIG. 12C shows an example case where the distribution of the toner application amount is gradually changed for each layer.

In the foil stamping device 40, when the overprinting completion information is received from the printing device 30 (S113), the printed matter on which the overprinting has been performed by the printing device 30 is set (S114). At this stage, the varnish forming unit 48 applies an adhesive such as varnish to the area defined by the print data, as necessary. The foil stamping unit 49 then performs foil stamping on the toner layer, to create the final printed matter (S115).

As described above, in the area in which foil stamping is to be performed, the thickness of the toner layer is varied (a portion in which the thickness of the toner layer is relatively large, and a portion in which the thickness of the toner layer is relatively small are formed). Thus, the cross-sectional shape of the foil portion can be made to reflect the shapes of the concave portion and the convex portion of the toner layer, and it is possible to achieve a texture similar to that in a case where a toner layer is formed by a foil stamping device using a foil plate.

Second Embodiment

Figure 13:
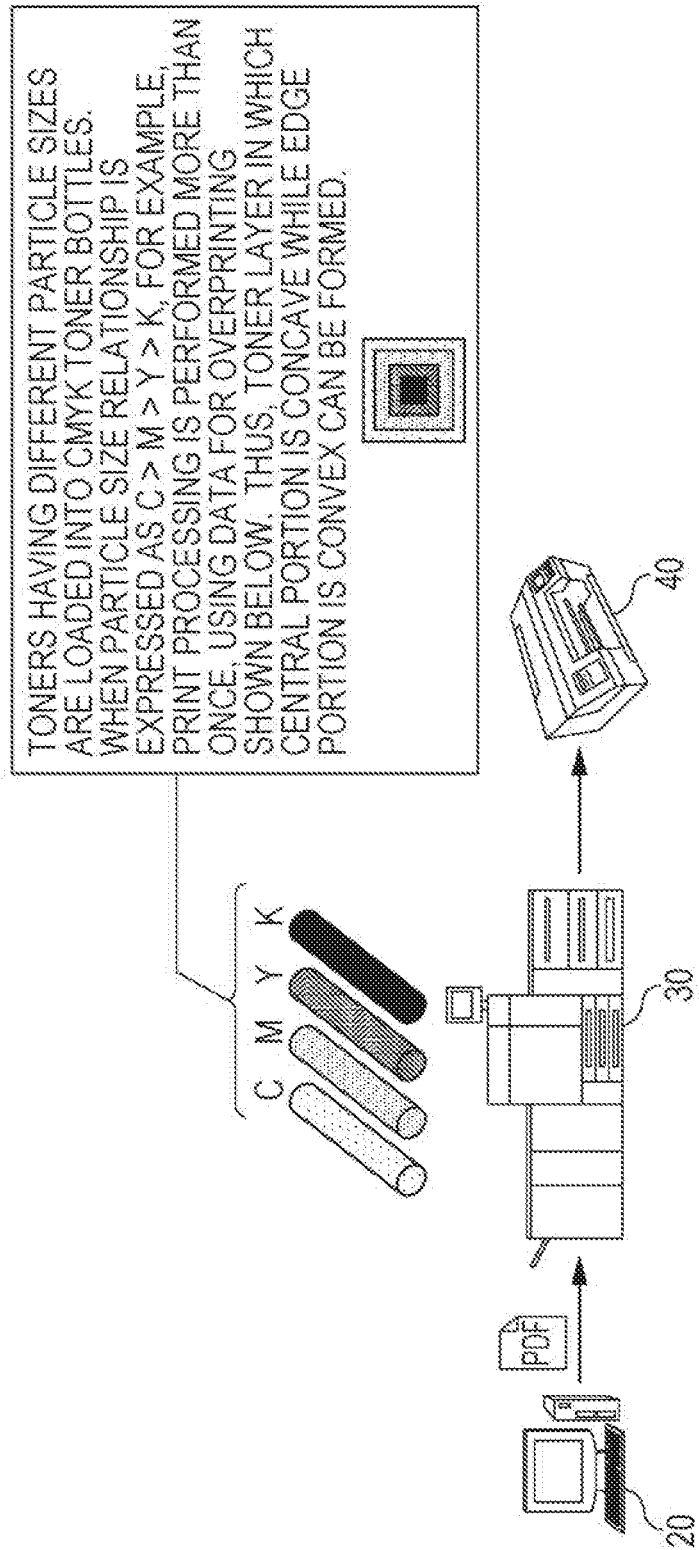
FIG. 13 is a diagram showing an example configuration of a printed matter foil stamping system according to a second embodiment of the present invention.
Figure 14:
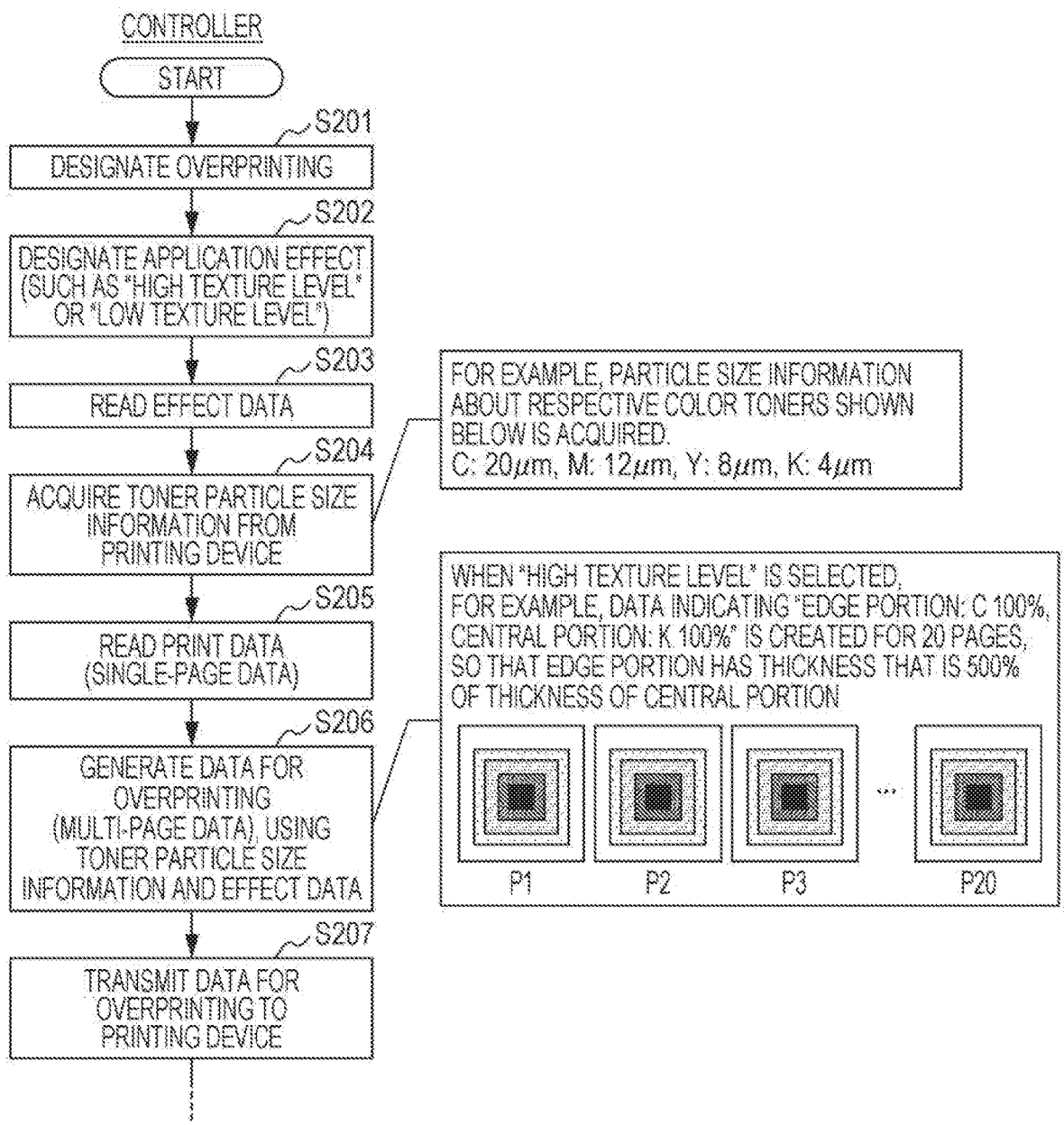
FIG. 14 is a flowchart showing operation of a controller according to the second embodiment of the present invention.

Next, a printed matter foil stamping system, a foil stamping print control method, and a foil stamping print control program according to a second embodiment of the present invention are described, with reference to FIGS. 13 and 14. FIG. 13 is a diagram showing an example configuration of the printed matter foil stamping system of this embodiment. FIG. 14 is a flowchart showing operation of a controller of this embodiment.

In the first embodiment described above, the thickness of the toner layer is changed by adjusting the toner application amount. However, it is also possible to change the thickness of the toner layer by using toners having different particle sizes.

Specifically, as shown in FIG. 13, toners having different particle sizes are loaded into CMYK toner bottles, and a plurality of types of toners are used to form a toner layer. For example, in a case where the particle sizes have the following relationship, C>M>Y>K, printing process is performed a plurality of times with data for overprinting that designates the toners of K, Y, M, and C in this order in the direction from the central portion toward the edge portion. In this manner, a toner layer in which the central portion is concave while the edge portion is convex can be formed.

In this case, the configuration of the printed matter foil stamping system is the same as that of the first embodiment. However, in a case where the particle sizes of the toners loaded in the printing device 30 differ from one another (for example, in a case where the four toner bottles are loaded with toners having different particle sizes), the print data generator 21b of the controller 20 acquires toner particle size information from the printing device 30, and generates data for overprinting in which different types of tones are used within the area in which foil stamping is to be performed, using the toner particle size information.

In the description below, operation of the controller 20 is explained in detail. The CPU 22 of the controller 20 loads a foil stamping print control program stored in the ROM 23 or the storage unit 25 into the RAM 24, and executes the foil stamping print control program, to perform the processes in the respective steps shown in the flowchart in FIG. 14. Note that operations of the printing device 30 and the foil stamping device 40 are the same as those shown in the flowchart in FIG. 11 of the first embodiment, and therefore, explanation thereof will not be repeated herein.

First, the control unit 21 (the printing condition designator 21a) receives designation of overprinting (S201), receives designation of an application effect such as a texture level or embossing (S202), and reads the effect data corresponding to the designated application effect from an application effect library or the like (S203). Note that, in a case where a predetermined effect is applied, S202 may be skipped.

The control unit 21 (the print data generator 21b) then acquires particle size information about the respective color toners from the printing device 30 (S204). For example, the acquired toner particle size information indicates that the particle size of the toner of C is 20 µm, the particle size of the toner of M is 12 µm, the particle size of the toner of Y is 8 µm, and the particle size of the toner of K is 4 µm. Next, the control unit 21 (the print data generator 21b) reads print data (single-page data) generated by the image processing unit 27 in accordance with a job received from the job creation device 10 (S205). Using the effect data read in S203 and the toner particle size information acquired in S204, the control unit 21 generates data for overprinting (multi-page data) (S206). For example, when a "high texture level" is selected as an application effect, 100% of the data of C is created at the edge portion, while 100% of the data of K is created at the central portion, for 20 pages. Thus, data for overprinting in which the edge portion has a thickness that is 500% of the thickness of the central portion can be generated. After that, the control unit 21 (the print data generator 21b) transmits the generated data for overprinting to the printing device 30 (S207).

As described above, a plurality of kinds of toners having different particle sizes are used, so that the thickness of the toner layer can also be varied (a portion in which the thickness of the toner layer is relatively large, and a portion in which the thickness of the toner layer is relatively small are formed). Thus, it is possible to achieve a texture similar to that in a case where a toner layer is formed by a foil stamping device using a foil plate. In this embodiment, data for overprinting for a plurality of pages is generated in this embodiment. However, in a case where the thickness of the toner layer can be sufficiently varied by one-time printing, data for overprinting for one page should be generated.

Third Embodiment

Figure 15:
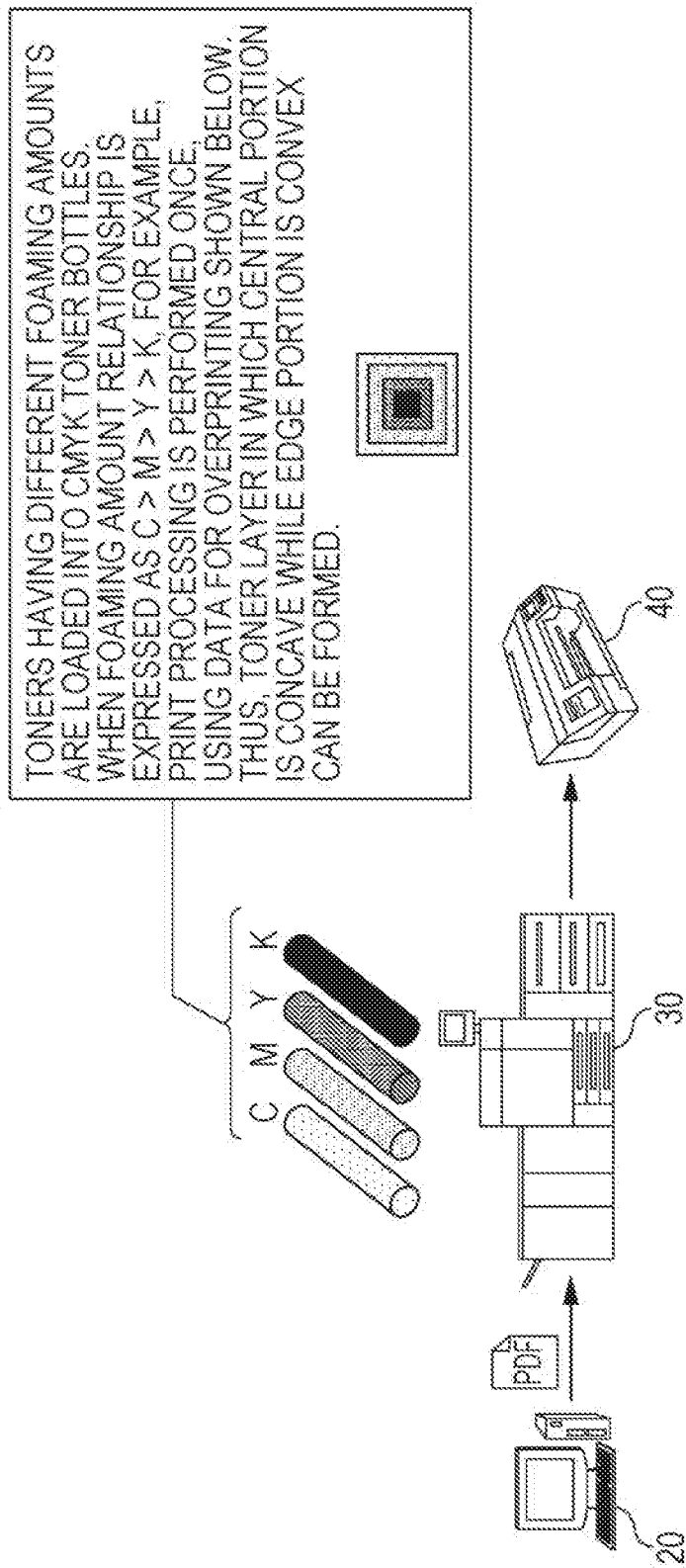
FIG. 15 is a diagram showing an example configuration of a printed matter foil stamping system according to a third embodiment of the present invention.
Figure 16:
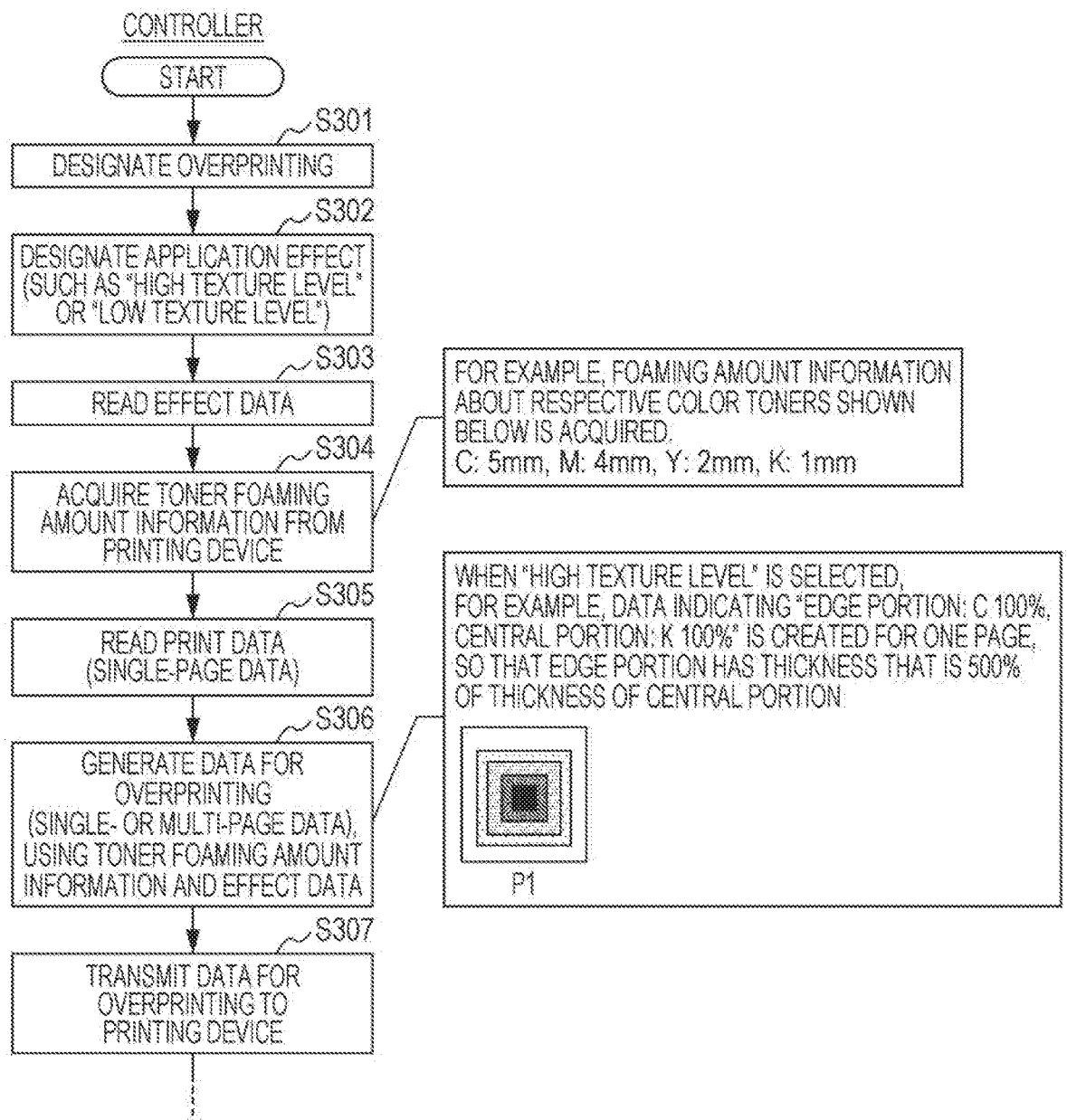
FIG. 16 is a flowchart showing operation of a controller according to the third embodiment of the present invention.

Next, a printed matter foil stamping system, a foil stamping print control method, and a foil stamping print control program according to a third embodiment of the present invention are described, with reference to FIGS. 15 and 16. FIG. 15 is a diagram showing an example configuration of the printed matter foil stamping system of this embodiment. FIG. 16 is a flowchart showing operation of a controller of this embodiment.

In the second embodiment described above, a plurality of kinds of toners having different particle sizes are used. However, it is also possible to change the thickness of the toner layer by using a plurality of kinds of toners having different foaming amounts (such as toners to be used in Braille printing).

Specifically, as shown in FIG. 15, toners having different foaming amounts are loaded into CMYK toner bottles, and a plurality of types of toners are used to form a toner layer. For example, in a case where the foaming amounts have the following relationship, C>M>Y>K, printing process is performed once with data for overprinting that designates the toners of K, Y, M, and C in this order in the direction from the central portion toward the edge portion. In this manner, a toner layer in which the central portion is concave while the edge portion is convex can be formed.

In this case, the configuration of the printed matter foil stamping system is the same as that of the first embodiment. However, in a case where the foaming amounts of the toners loaded in the printing device 30 differ from one another (for example, in a case where the four toner bottles are loaded with toners having different foaming amounts), the print data generator 21b of the controller 20 acquires toner foaming amount information from the printing device 30, and generates data for overprinting in which different types of toners are used within the area in which foil stamping is to be performed, using the toner foaming amount information.

In the description below, operation of the controller 20 is explained in detail. The CPU 22 of the controller 20 loads a foil stamping print control program stored in the ROM 23 or the storage unit 25 into the RAM 24, and executes the foil stamping print control program, to perform the processes in the respective steps shown in the flowchart in FIG. 16. Note that operations of the printing device 30 and the foil stamping device 40 are the same as those shown in the flowchart in FIG. 11 of the first embodiment, and therefore, explanation thereof will not be repeated herein.

First, the control unit 21 (the printing condition designator 21a) receives designation of overprinting (S301), receives designation of an application effect such as a texture level or embossing (S302), and reads the effect data corresponding to the designated application effect from an application effect library or the like (S303). Note that, in a case where a predetermined effect is applied, S302 may be skipped.

The control unit 21 (the print data generator 21b) then acquires foaming amount information about the respective color toners from the printing device 30 (S304). For example, the acquired toner foaming amount information indicates that the foaming amount of the toner of C is 5 mm, the foaming of the toner of M is 4 mm, the foaming amount of the toner of Y is 2 mm, and the foaming amount of the toner of K is 1 mm. Next, the control unit 21 (the print data generator 21b) reads print data (single-page data) generated by the image processing unit 27 in accordance with a job received from the job creation device 10 (S305). Using the effect data read in S303 and the toner foaming amount information acquired in S304, the control unit 21 generates data for overprinting (single- or multi-page data) (S306). For example, when a "high texture level" is selected as an application effect, 100% of the data of C is created at the edge portion, while 100% of the data of K is created at the central portion, for one page. Thus, data for overprinting in which the edge portion has a thickness that is 500% of the thickness of the central portion can be generated. After that, the control unit 21 (the print data generator 21b) transmits the generated data for overprinting to the printing device 30 (S307).

As described above, a plurality of kinds of toners having different foaming amounts are used, so that the thickness of the toner layer can also be varied (a portion in which the thickness of the toner layer is relatively large, and a portion in which the thickness of the toner layer is relatively small are formed). Thus, it is possible to achieve a texture similar to that in a case where a toner layer is formed by a foil stamping device using a foil plate. Further, in a case where foamable toners are used, a sufficient thickness of the toner layer can be secured by one-time printing. Thus, the printing process time can be shortened.

Fourth Embodiment

Figure 17:
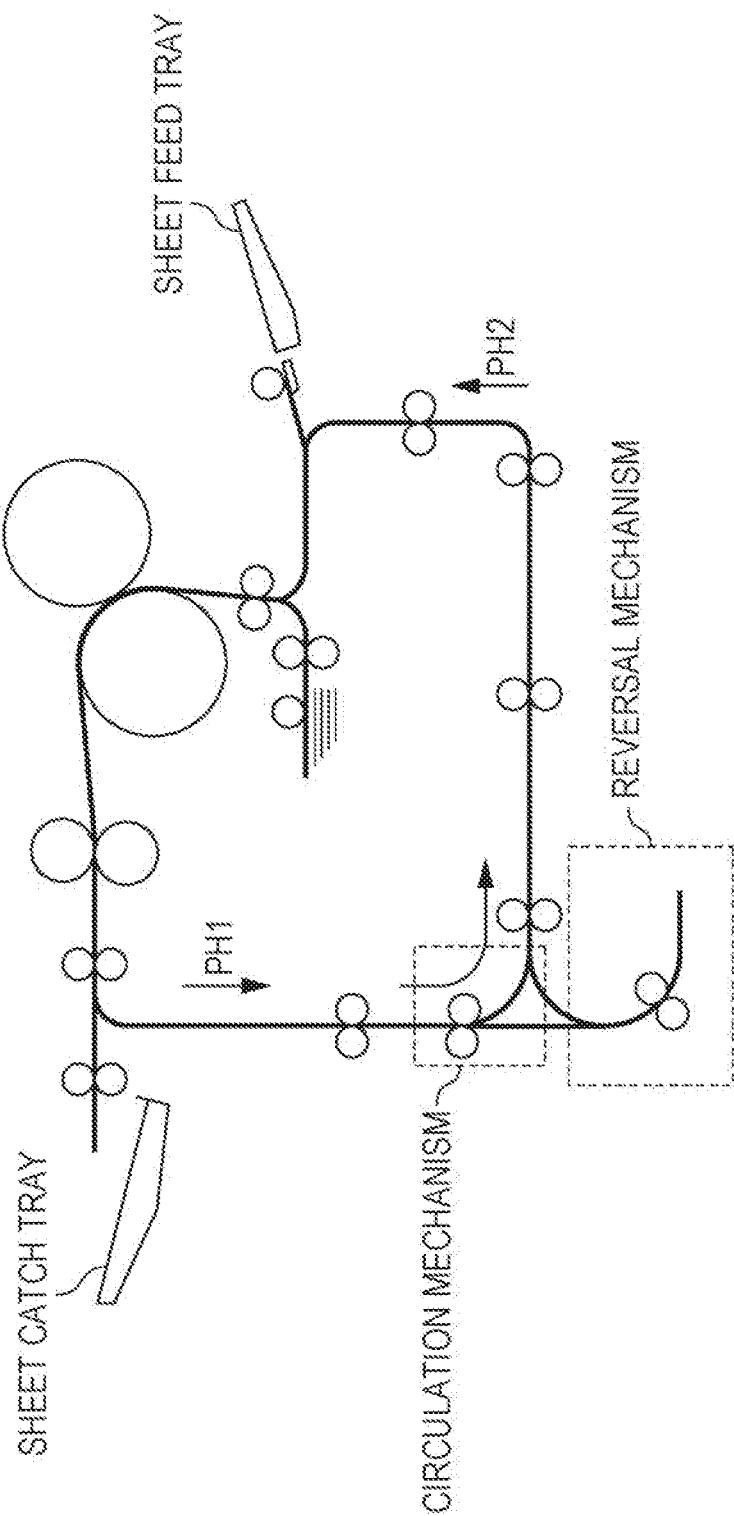
FIG. 17 is a schematic diagram showing the configuration of a printing device according to a fourth embodiment of the present invention.

Next, a printed matter foil stamping system, a foil stamping print control method, and a foil stamping print control program according to a fourth embodiment of the present invention are described, with reference to FIG. 17. FIG. 17 is a schematic diagram showing the configuration of a printing device of this embodiment.

In a case where printing is performed a plurality of times, the user has to perform a process of loading the sheet feed tray with paper sheets ejected onto the sheet catch tray so many times that the process becomes tiresome. Therefore, in this embodiment, the print processing unit 38 is equipped with a mechanism for circulating each paper sheet in the machine a designated number of times and performing overprinting, so that printed matter can be created without human intervention.

FIG. 17 is a schematic diagram showing an example of the mechanism for circulating each paper sheet in the machine. When double-sided printing is performed, each paper sheet normally passes through a sheet reversal mechanism. In this embodiment, however, toner overprinting is performed on the same surface of a paper sheet, and therefore, the paper sheet does not pass through a sheet reversal mechanism, but is circulated with a circulation mechanism (a means that switches conveyance paths so that the paper sheet being conveyed from PH1 is returned directly to PH2). With this arrangement, it is possible to automatically perform overprinting on the same surface of a paper sheet a designated number of times, and thus, save the user's trouble.

Fifth Embodiment

Figure 18:
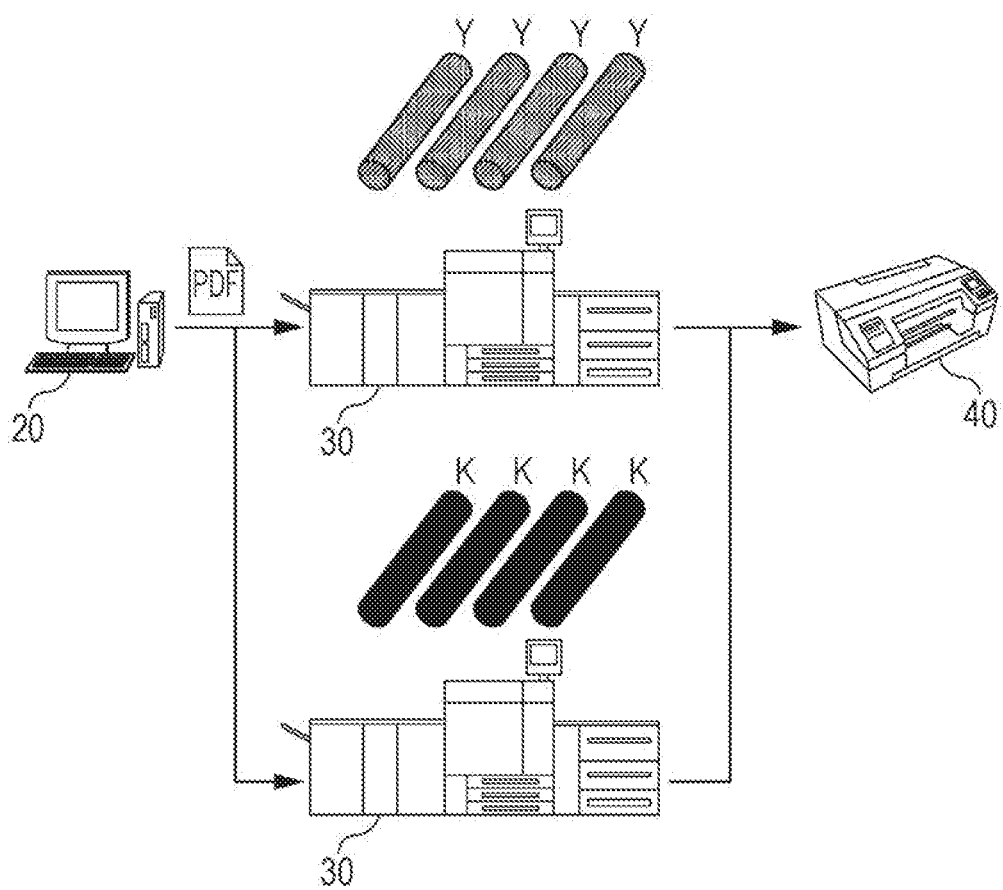
FIG. 18 is a diagram showing an example configuration of a printed matter foil stamping system according to a fifth embodiment of the present invention.

Next, a printed matter foil stamping system, a foil stamping print control method, and a foil stamping print control program according to a fifth embodiment of the present invention are described, with reference to FIG. 18. FIG. 18 is a diagram showing an example configuration of the printed matter foil stamping system of this embodiment.

In the first embodiment described above, the thickness of the toner layer is changed with toners of the respective colors (the four colors of CMYK, for example). However, in a case where the foil to be used is determined in advance, it is preferable to designate the toner color to be used in accordance with the color of the foil, so that a portion from which the foil has come off would not be easily spotted.

In this case, as shown in FIG. 18, a plurality of printing devices 30 provided with toners of different colors (for example, a printing device 30 provided only with the toner of Y, and a printing device 30 provided only with the toner of K) are included in the printed matter foil stamping system. The print data generator 21b of the controller 20 generates print data that designates the toner of the color corresponding to the color of the foil (a toner of a color similar to the color of the foil; for example, the toner of Y in the case of gold foil, and the toner of K in the case of silver foil) so that any portion from which the foil has come off would not be easily spotted, and transmits the generated print data to the printing device 30 provided with the toner of the designated color. The printing device 30 then continuously forms a toner layer, using a plurality of toners of the designated color.

As described above, in a case where toners of the same color are loaded in the four toner bottles, formation of a toner layer can be consecutively performed four times, using these four toner bottles. Thus, the toner layer creation time can be shortened.

It should be noted that the print data may be transmitted to a conventional printing device 30 (a printing device 30 provided with toners of the four colors of CMYK), and the printing device 30 may form a toner layer using only the toner of the color designated by the print data. In the first through third embodiments, the print data generator 21b generates print data that designates a color in accordance with the color of the foil for the color of the toner to be formed at least on the uppermost layer. As a toner layer in the designated color is formed at least on the uppermost layer, a portion from which the foil has come off would be inconspicuous.

Sixth Embodiment

Next, a printed matter foil stamping system, a foil stamping print control method, and a foil stamping print control program according to a sixth embodiment of the present invention are described, with reference to FIG. 19. FIG. 19 is a diagram showing an example configuration of the printed matter foil stamping system of this embodiment.

In the first embodiment, the user designates a desired application effect from among predetermined application effects. However, any application effect can be created and designated.

In this case, the configuration of the printed matter foil stamping system is the same as that of the first embodiment. However, the control unit 11 (the image creating unit 11a) of the job creation device 10 uses a desktop publishing (DTP) application, to generate a gray image in any desired pattern (a tagged image file format (TIFF) image) and transmit the gray image to the controller 20. The control unit 21 (the printing condition designator 21a) of the controller 20 registers the TIFF image in an application effect library, so that the shapes of the concave portion and the concavity portion of the desired pattern can be applied in creating a toner layer. For example, it is possible to designate an embossing effect as an application effect.

It should be noted that the present invention is not limited to the respective embodiments described above, and any appropriate modifications may be made to the configurations and the control thereof, without departing from the scope of the present invention.

For example, in the above embodiments, a toner layer is formed by an electrophotographic technique. However, in a case where an ink layer is formed by an ink jet technique, a foil stamping print control method of the present invention can also be implemented.

The present invention can be applied to a printed matter foil stamping system including a printing device that forms a toner layer or an ink layer on a paper sheet and a foil stamping device that performs foil stamping on the toner layer or the ink layer, a foil stamping print control method for controlling formation of the toner layer or the ink layer for foil stamping, a foil stamping print control program, and a recording medium storing the foil stamping print control program.

Although embodiments of the present invention have been described and illustrated in detail, the disclosed embodiments are made for purposes of illustration and example only and not limitation. The scope of the present invention should be interpreted by terms of the appended claims.

What is claimed is:

1. A printed matter foil stamping system comprising: a printing device that forms a toner layer or an ink layer on a paper sheet in accordance with print data; and a foil stamping device that performs foil stamping on the toner layer or the ink layer, wherein the printing device or a control device that controls the printing device includes
a hardware processor that generates print data capable of forming a portion in which a thickness of the toner layer or the ink layer is relatively large and a portion in which the thickness is relatively small in an area in which foil stamping is to be performed, and,
in accordance with the print data, the printing device forms the toner layer or the ink layer having a portion with a relatively large thickness and a portion with a relatively small thickness on the paper sheet.

2. The printed matter foil stamping system according to claim 1, wherein the hardware processor generates the print data in which the thickness of the toner layer or the ink layer is varied between an edge portion and a central portion of the area in which foil stamping is to be performed.

3. The printed matter foil stamping system according to claim 1, wherein the hardware processor generates the print data in which an application amount of the toner layer or the ink layer is varied in the area in which foil stamping is to be performed.

4. The printed matter foil stamping system according to claim 1, wherein
the printing device includes a plurality of types of toners or inks having different particle sizes or foaming amounts, and
the hardware processor generates the print data in which the types of the toners or the inks to be used are changed in the area in which foil stamping is to be performed.

5. The printed matter foil stamping system according to claim 1, wherein
the hardware processor generates the print data of a plurality of pages, and
the printing device sequentially forms and laminates the toner layer or the ink layer, in accordance with the print data of the plurality of pages.

6. The printed matter foil stamping system according to claim 5, wherein, for each page, the hardware processor generates print data of the plurality of pages in which a distribution of an application amount of the toner or the ink, or a distribution of the type of the toner or the ink to be used is varied.

7. The printed matter foil stamping system according to claim 5, wherein the printing device includes a mechanism for circulating the paper sheet in the printing device, and continuously forms the toner layer or the ink layer a designated number of times.

8. The printed matter foil stamping system according to claim 5, wherein the hardware processor generates the print data in which a color of the toner or the ink to be formed at least on the uppermost layer is designated in accordance with a color of foil.

9. The printed matter foil stamping system according to claim 5, further comprising
a plurality of the printing devices,
wherein
each of the printing devices includes a plurality of the toners or the inks of the same color, and
the printing device including the toner or the ink corresponding to a color of foil continuously forms the toner layer or the ink layer.

10. The printed matter foil stamping system according to claim 1, wherein
the printing device or the control device further includes
a hardware processor that designates an effect corresponding to a shape of the toner layer or the ink layer, and the hardware processor generates the print data in accordance with the designated effect.

11. The printed matter foil stamping system according to claim 10, wherein the effect includes an embossing effect.

12. A foil stamping print control method implemented in a printing device to which a foil stamping device that performs foil stamping on a toner layer or an ink layer is connected, the foil stamping print control method comprising:
performing a print data generation process to generate print data capable of forming a portion in which a thickness of the toner layer or the ink layer is relatively large and a portion in which the thickness is relatively small in an area in which foil stamping is to be performed, the print data generation process being performed by the printing device or a control device that controls the printing device; and
performing a printing process to form the toner layer or the ink layer having a portion with a relatively large thickness and a portion with a relatively small thickness on a paper sheet, the printing process being performed by the printing device in accordance with the print data.

13. The foil stamping print control method according to claim 12, wherein the print data generation process includes generating the print data in which the thickness of the toner layer or the ink layer is varied between an edge portion and a central portion of the area in which foil stamping is to be performed.

14. The foil stamping print control method according to claim 12, wherein the print data generation process includes generating the print data in which an application amount of the toner layer or the ink layer is varied in the area in which foil stamping is to be performed.

15. The foil stamping print control method according to claim 12, wherein
the printing device includes a plurality of types of toners or inks having different particle sizes or foaming amounts, and
the print data generation process includes generating the print data in which the types of the toners or the inks to be used are changed in the area in which foil stamping is to be performed.

16. The foil stamping print control method according to claim 12, wherein
the print data generation process includes generating the print data of a plurality of pages, and
the printing process includes sequentially forming and laminating the toner layer or the ink layer, in accordance with the print data of the plurality of pages.

17. The foil stamping print control method according to claim 16, wherein the print data generation process includes generating print data of the plurality of pages in which a distribution of an application amount of the toner or the ink, or a distribution of the type of the toner or the ink to be used is varied.

18. The foil stamping print control method according to claim 16, wherein
the printing device includes a mechanism for circulating the paper sheet in the printing device, and
the printing process includes continuously forming the toner layer or the ink layer a designated number of times.

19. The foil stamping print control method according to claim 16, wherein the print data generation process includes generating the print data in which a color of the toner or the ink to be formed at least on the uppermost layer is designated in accordance with a color of foil.

20. The foil stamping print control method according to claim 16, wherein
the printed matter foil stamping system includes
a plurality of the printing devices,
each of the printing devices includes a plurality of the toners or the inks of the same color, and
the printing process includes continuously forming the toner layer or the ink layer, the printing process being performed by the printing device including the toner or the ink corresponding to a color of foil.

21. The foil stamping print control method according to claim 12, wherein
the printing device or the control device further performs
a printing condition designation process to designate an effect corresponding to a shape of the toner layer or the ink layer, and
the print data generation process includes generating the print data in accordance with the designated effect.

22. The foil stamping print control method according to claim 21, wherein the effect includes an embossing effect.

23. A non-transitory recording medium storing a computer readable foil stamping print control program to be executed in a printing device to which a foil stamping device that performs foil stamping on a toner layer or an ink layer is connected, or in a control device that controls the printing device,
the program causing the printing device or the control device to perform:
a printing condition designation process to designate an effect corresponding to a shape of the toner layer or the ink layer; and
a print data generation process to generate print data capable of forming a portion in which a thickness of the toner layer or the ink layer is relatively large and a portion in which the thickness is relatively small in an area in which foil stamping is to be performed, in accordance with the designated effect.

* * * * *